United States Patent [19]

Hatamura et al.

[11] Patent Number: 4,674,339
[45] Date of Patent: Jun. 23, 1987

[54] MULTI-AXIS LOAD SENSOR

[75] Inventors: Yotaro Hatamura, 12-11, Kohinata 2-chome, Bunkyo-ku, Tokyo; Kozo Ono, Toride; Ryuji Takada, Chiyoda; Takami Kusaki, Oaza-Shimoinayoshi, all of Japan

[73] Assignees: Yotaro Hatamura; Hitachi Construction Machinery Co., Ltd., both of Tokyo, Japan

[21] Appl. No.: 769,722

[22] Filed: Aug. 27, 1985

[30] Foreign Application Priority Data

Aug. 30, 1984 [JP] Japan ............................ 59-179403
May 31, 1985 [JP] Japan ............................ 60-116759

[51] Int. Cl.⁴ ............................................... G01L 5/16
[52] U.S. Cl. ................................................ 73/862.04
[58] Field of Search ........... 73/862.04, 862.05, 862.06, 73/862.67, 862.65

[56] References Cited

U.S. PATENT DOCUMENTS 4,520,679 6/1985 Hatamura ..................... 73/862.04
4,573,362 3/1986 Amlani ........................ 73/862.04

FOREIGN PATENT DOCUMENTS 0000392 1/1971 Japan ......................... 73/862.04
57-7657 2/1982 Japan .
58-88631 5/1983 Japan .
60-55239 3/1985 Japan .

OTHER PUBLICATIONS

VDI-Berichte, No. 176, 1972.

Primary Examiner—Charles A. Ruehl
Attorney, Agent, or Firm—Oblon, Fisher, Spivak, McClelland & Maier

[57] ABSTRACT

A multi-axis load sensor is composed of at least one of a parallel plate structure connecting two members to each other by means of a plurality of flexible beams arranged in parallel to one another and a radial plate structure connecting the two members to each other by means of a plurality of flexible beams arranged radially. relative to a given point and equipped with detection means for detecting deformations of the associated flexible beams. The deformations are of the bending deformation mode and are developed by a load applied to the associated flexible beams. At least one of the associated flexible beams is provided with another detection means for detecting deformations of a deformation mode different from the bending mode. The multi-axis load sensor is simple in structure and easily machined.

8 Claims, 47 Drawing Figures

Fig 4
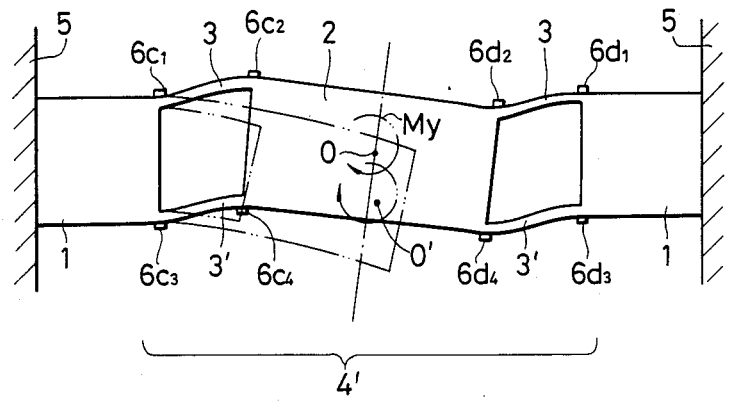
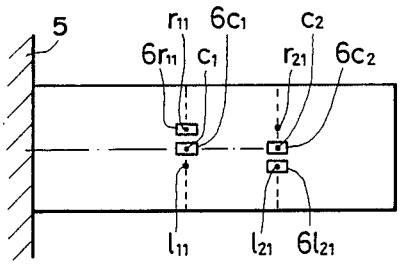
Fig 5 (c)
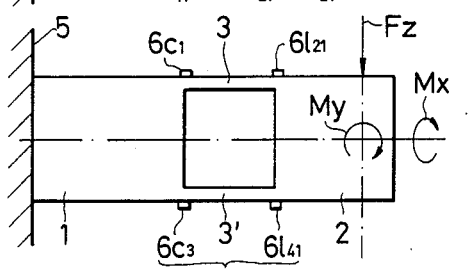
Fig 5 (a)
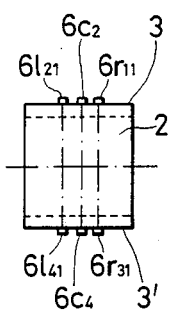
Fig 5 (b)
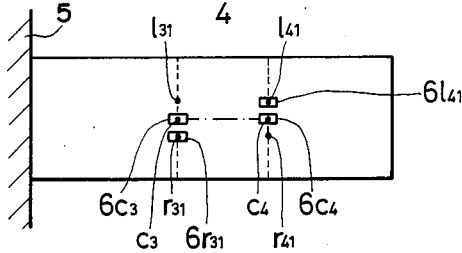
Fig 5 (d)

(a)

(b)

(a)

(b)

(c)

MULTI-AXIS LOAD SENSOR

FIELD OF THE INVENTION

This invention relates to a multi-axis load sensor adapted to detect force components produced respectively in the direction of the coordinate axes and moment components produced respectively about the coordinate axes upon application of a load to each of various bodies.

BACKGROUND OF THE INVENTION

In many fields, it is indispensable to detect each load (its force and moment) applied to a body or a specific portion of the body. When effecting for example assembly work or grinding/deburring work by means of a high-performance robot, it is necessary to detect precisely loads applied to the hand of the robot. When conducting a model test for aircraft, shipping, vehicle or the like, the detection of loads exerted to various parts also becomes principal test items.

As sensors excellent for use in the detection of such loads, there have been proposed sensors each making use of a parallel plate structure for detecting force components only in the direction of a standard axis and sensors each of which employs a radial plate structure capable of detecting moment components about a standard axis. Such parallel and radial plate structures will hereinafter be described with reference to certain drawings.

FIG. 21 is a perspective view of a planar flexible beam which is a component of a parallel or radial plate structure. In the drawing, numeral 39 indicates a support portion and numeral 40 designates a planar flexible beam supported in a cantilevered fashion on the support portion 39. Let's now set up axes X, Y and Z, which are perpendicular to each other, as shown in the drawing. Let's thus represent the force components along the axes X, Y and Z as well as the moment components about the same axes at the tip portion of the planar flexible beam 40 as $F_X$, $F_Y$ and $F_Z$ as well as $M_X$, $M_Y$ and $M_Z$ respectively. The planar flexible beam 40 is thinner in the direction of the Z-axis. Its dimensions in the directions of the X-axis and Y-axis are significantly greater than its thicknesswise dimension. Accordingly, it is susceptible of developing bending deformation by the force $F_Z$. It is also susceptible of developing deformation by the moment $M_Y$ which causes the tip portion of the planar flexible beam 40 to undergo movement in the direction of the Z-axis. On the other hand, the planar flexible beam 40 is extremely resistant to deformations by the forces $F_X$, $F_Y$ and moment $M_Z$. The susceptibility of deformation by the moment $M_X$ lies between those by the force $F_Z$ and moment $M_Y$ and those by the forces $F_X$, $F_Y$ and moment $M_Z$, and may be ignored or may not be ignored depending on the dimensions of the planar flexible beam 40 or the extent of deformation under consideration. The parallel plate structures and radial plate structures have been constructed on the basis of these characteristics of the planar flexible beam 40.

FIG. 22(a) through FIG. 22(c) are side views of a parallel plate structure. In each of these figures, there are illustrated a fixed portion 41 supported on the support portion 39 and made of a rigid material and a movable portion 42 located opposite to the support portion 39 and made of a rigid material. Numerals 43,43' indicate thin-walled portions which connect the fixed portion 41 and the movable portion 42 to each other. These thin-walled portions 43,43' are arranged parallel to each other and have deformation characteristics similar to the planar flexible beam 40 shown in FIG. 21. Designated at numeral 44 is a parallel plate structure, which has a shape obtained by boring a square hole through a rigid body because thin-walled portions 43,43' are arranged in parallel to each other therein. It should, however, be borne in mind that the shape of the hole, which defines the thin-walled portions 43,43', is not necessarily limited to such a square shape, as will be described hereinafter. Letter K indicates the standard axis of the parallel plate structure 44, which standard axis extends through the movable portion 42 of the parallel plate structure 44. The standard axis K is located at a suitable distance from the thin-walled portions 43,43' and is near a point at which the below-described force $F_Z$ is principally applied. Designated at numerals 45,46,47, 48 are strain gauges provided respectively at end parts of the thin-walled portions 43,43'.

When the force $F_Z$ is applied in the direction of the Z-axis to the movable portion 42 of the parallel plate structure 44, the thin-walled portions 43,43' of the parallel plate structure 44 undergo bending deformations of the same pattern as depicted in FIG. 22(b). These deformations occur readily because, as mentioned above, the planar flexible beam 40 of FIG. 21 is susceptible to bending deformation to the force $F_Z$ applied in the direction of the Z-axis and moreover, the deformations of the thin-walled portions 43,43' are of the same pattern and their mutual interference is limited to a small extent.

Let's discuss the deformation of the parallel plate structure when the moment $M_Y$ is applied to the movable portion 42. The planar flexible beam 40 of FIG. 21 is by itself susceptible to bending deformation by the moment $M_Y$. But, as for the parallel plate structure 44 composed of two planar flexible beams only, the deformation mode caused by the moment $M_Y$ is such that the thin-walled portion 43 is elongated while the thin-walled portion 43' is compressed as shown in FIG. 22(c). This deformation makes the length of the thin-walled portions 43,43' different from each other and, correspondingly, produces a pair of large internal stresses of different directions along the direction of the X-axis within the thin-walled portions 43,43' respectively. Therefore, the moment $M_Y$ has to be of a very large magnitude in order to produce such deformation. In other words, the parallel plate structure 44 has a very high rigidity against the moment $M_Y$.

Although the twisting deformations of the thin-walled portions 43,43' by the moment $M_X$ are smaller compared with their bending deformations by the force $F_Z$ and moment $M_Y$ as aforementioned on the planar flexible beam 40 of FIG. 21, their extents are not small enough to permit them to be ignored compared with the bending deformations of the thin-walled portions 43,43' as mentioned above. The thin-walled portions 43,43' have been rendered sufficiently rigid against the moment $M_X$ by arranging them into the parallel plate structure. However, the influence of twisting deformations cannot be ignored when a still greater moment, $M_X$, is applied. Even in this case, it is still possible to get rid of the influence of twisting deformations if the strain gauges 45,46,47,48 of FIG. 22 are provided at the thin-walled portions 43,43' in the middle of dimension perpendicular to the drawing sheet, because no strains are produced there by such twisting deformations. By the way, it is apparent that the rigidity against the forces $F_X, F_Y$ and moment $M_Z$ are sufficiently high as the thin-walled portions 43,43' have by themselves high rigidity against such forces and moment.

From the above, it has been understood that the parallel plate structure 44 of FIG. 22 undergoes a significant deformation only by the force $F_Z$ and is very rigid against the other forces and moments. Namely, it is appreciated that this parallel plate structure 44 is suitable for use as a force detection element adapted to detect the force component $F_Z$ only out of a given load.

Here, description is made on the detection of strains of the thin-walled portions 43,43' by the strain gauges 45,46,47,48. When the force $F_Z$ is applied as shown in FIG. 22(b), tensile strains are produced in the strain gauges 45,48 while compression strains are developed in the strain gauges 46,47. When the forces $F_X, F_Y$ and moments $M_X, M_Y, M_Z$ are exerted concurrently with the force $F_Z$, the strain gauges 45, 46,47,48 are not affected by $F_X, F_Y, M_Z$ as the thin-walled portions 43,43' are substantially rigid against them. However, the strain gauges 45,46,47,48 are deformed by $M_X, M_Y$ in modes corresponding thereto, although their deformations are slight. It has already been mentioned that the influence of $M_X$ can be overcome by making suitable selection as to the positions where the strain gauges are arranged. However, a deformation mode such as that depicted in FIG. 22(c) is developed by $M_Y$ to a certain extent. The strain due to deformation by the force $F_Z$ can be enlarged and the small output component corresponding to the deformation by the moment $M_Y$ can be cancelled out, provided that a bridge circuit is constructed in such a way that the outputs of the strain gauges 45,48 are added together, the outputs of the strain gauges 46,47 are also added together, and that the subtracted signal of the thus-added values is put out. In this manner, a correct signal proportional to the force $F_Z$ can be obtained.

As these detection means, there are other strain detection means such as magnetic strain elements besides strain gauges. Similar detection is feasible with such other magnetic strain elements. It is also possible to make up detection elements for the force $F_Z$ by using differential transformers and electrocapacitive or eddy-current displacement detection elements for the detection of displacement of the movable portion 42 in the Z-direction while making use of the characteristic feature that the parallel plate structure 44 undergoes a significant deformation only by the force $F_Z$.

FIG. 23(a) through FIG. 23(c) are side views of a radial plate structure. In each of the figures, numeral 51 indicates a fixed portion supported on the support portion 39 and made of a rigid material, while numeral 52 designates a movable portion located opposite to the support portion 39 and made of a rigid material. Designated at numerals 53,53' are thin-walled portions which connect the fixed portion 51 and the movable portion 52 to each other. These thin-walled portions 53,53' extend radially at a crossing angle $\theta$, starting at a point O from the movable portion 52 toward the fixed portion 51. Each of the thin-walled portions 53,53' has deformation characteristics equivalent to that of the planar flexible beam 40 illustrated in FIG. 21. By the way, this crossing angle $\theta$ is set at an acute angle for the convenience of explanation. Designated at numeral 54 is a radial plate structure, which has a shape formed by boring a trapezoidal hole through a rigid body because the thin-walled portions 53,53' are arranged radially. It should however be borne in mind that the shape of the hole defining the thin-walled portions 53,53' is not necessarily limited to such a trapezoidal shape, as will be described hereinafter. Letter K indicates an axis which extends through the point O on the movable portion 52 of the radial plate structure 54 and perpendicularly to the drawing sheet. The axis K serves as the standard axis of the radial plate structure 54. Numerals 55,56,57,58 are strain gauges provided respectively at end parts of the thin-walled portions 53,53'.

When a moment $M_Y$ is applied about the Y-axis to the movable portion 52 of the radial plate structure 54, the thin-walled portions 53,53' of the radial plate structure 54 undergo bending deformations of substantially the same pattern as illustrated in FIG. 23(b). These deformations occur readily, since as mentioned above, the planar flexible beam 40 of FIG. 21 is susceptible of undergoing a bending deformation by a force applied at a right angle thereto and the deformations of the thin-walled portions 53,53' are of substantially the same pattern and the degree of their mutual interference is small.

A further discussion will be made on the deformation of the radial plate structure 54 when a force $F_Z$ is exerted to the movable portion 52. Although the planar flexible beam 40 of FIG. 21 is by itself susceptible to a bending deformation by the force $F_Z$, the radial plate structure 54 composed by combining two parallel beams, each being of the same type as the planar flexible beam 40, has such a deformation mode for the force $F_Z$ that the thin-walled portion 53 is elongated and the thin-walled portion 53' is compressed as shown in FIG. 23(c). This deformation renders the lengths of the thin-walled portions 53,53' different from each other and correspondingly, produces a pair of large internal axial stresses of opposite directions within the thin-walled portions 53,53' respectively. Therefore, the force $F_Z$ has to be very large in order to develop such a deformation. In other words, the radial plate structure 54 has a very high rigidity against the force $F_Z$.

Although the twisting deformations of the thin-walled portions 53,53' by the moment $M_X$ are smaller than their bending deformations as aforementioned on the planar flexible beam 40 of FIG. 21, their twisting deformations are not of such extents as being successfully ignorable compared with their bending deformations as mentioned above. However, the thin-walled portions 53,53' can be rendered sufficiently rigid against the moment $M_X$ by forming them into a radial plate structure. When a still greater moment $M_X$ is applied, the influence of the twisting deformations becomes no longer ignorable. In this case, it is possible, as mentioned above, to remove the influence of the twisting deformations by providing the strain gauges 55,56,57,58 on the thin-walled portions 53,53' in the middle of dimension perpendicular to the drawing sheet because no strain would be produced there by twisting deformations. By the way, it is apparent that the radial plate structure 54 has sufficiently high rigidity against the forces $F_X, F_Y$ and moment $M_Z$, since the thin-walled portions 53,53' have by themselves high rigidity against such forces and moment.

For the reasons mentioned above, it has been found that the radial plate structure 54 of FIG. 23 undergoes a significant deformation only by the moment $M_Y$ but is very rigid against the other moments and forces. Namely, it is appreciated that this radial plate structure 54 is most suitable as a moment detection element capable of detecting only the moment component $M_Y$ out of a given load.

Here, description is made on the detection of strains of the thin-walled portions 53,53' by the strain gauges 55,56,57,58. When the moment $M_Y$ is applied as shown in FIG. 23(b), tensile strains are produced in the strain gauges 55,58 while compression strains are developed in the strain gauges 56,57. When the forces $F_X,F_Y,F_Z$ and the moments $M_X,M_Z$ are exerted concurrently with the moment $M_Y$, the strain gauges 55, 56,57,58 are not affected by the forces $F_X,F_Y$ and the moment $M_Z$. The radial plate structure 54 is substantially rigid against the forces $F_X,F_Y$ and the moment $M_Z$, but it undergoes slight deformations by the force $F_Z$ and the moment $M_X$ as mentioned above. It has already been mentioned that the influence of $M_X$ can be overcome by making suitable selection as to the positions where the strain gauges are arranged. However, a deformation mode such as that depicted in FIG. 23(c) is slightly developed by the force $F_Z$. The strain due to deformation by the moment $M_Y$ can be enlarged and the small output component corresponding to the deformation by the force $F_Z$ can be cancelled out, provided that a bridge circuit is constructed in such a way that the outputs of the strain gauges 55,58 are added together, the outputs of the strain gauges 56,57 are also added together, and that the subtracted signal of the thus-added values is put out. In this manner, a correct signal proportional to the moment $M_Y$ can be obtained.

In the above description, the crossing angle $\theta$ between the thin-walled portions 53,53' is set at an acute angle for the sake of convenience. If it is an obtuse angle, the rigidity of the radial plate structure 54 against the respective moments $M_X,M_Z$, mentioned above, will be reversed. If the crossing angle $\theta$ is 90 degree, its rigidity against the moment $M_X$ and that against the moment $M_Z$ will be equal to each other. Whether those rigidities against the moments $M_X,M_Z$ are different or the same, the radial plate structure 54 will undergo slight twist deformation by one or both of those moments, when they are large. For the elimination of such influence, the strain gauges 55,56,57,58 may be arranged on the thin-walled portions 53,53' in the middle of the dimension perpendicular to the drawing sheet as mentioned above.

FIG. 24(a) through FIG. 24(d) are side views of another parallel plate structure and radial plate structure. In these figures, like reference numerals and letters identify like elements of the parallel plate structure shown in FIG. 22(a) through FIG. 22(c) and those of the radial plate structure depicted in FIG. 23(a) through FIG. 23(c). In FIG. 24(a), numeral 49 indicates a parallel plate structure. FIG. 24(b) illustrates a deformation which takes place when the $F_Z$ force is applied in the direction of the Z-axis to the standard axis K of the parallel plate structure 49. In FIG. 24(c), numeral 59 indicates a radial plate structure. FIG. 24(d) illustrates a deformation which takes place when the moment $M_Y$ is applied about the standard axis K of the radial plate structure 59. The parallel plate structure 44 and the radial plate structure 54 shown respectively in FIG. 22(a) and FIG. 23(a) exhibit better characteristics when they are formed into symmetrical structures relative to their vertical central axes as depicted in FIGS. 24(a) and 24(c). Although all the characteristic features which have been described above are contained in the parallel plate structure 49 and the radial plate structure 59, such symmetrical structures stabilize the deformation modes typical to the respective structures and permit better performance. In FIG. 22(a), the definition for the standard axis K of the parallel plate structure 44 is not clear. However, it is clear in FIG. 24(a). Namely, the standard axis K is an axis which extends through the center of the movable portion 42 and also at equal distances from the centers of the thin-walled portions 43,43' in a direction perpendicular to the thin-walled portions 43,43'. The standard axis K of the radial plate structure 59 is exactly the same as that illustrated in FIG. 23(a).

FIG. 25(a) through FIG. 25(d) are side views of further parallel plate structures and radial plate structures. In these figures, like reference numerals and letters identify like elements of structures illustrated in FIG. 22(a) and FIG. 23(a). In FIG. 25(a), numeral 64 indicates a circular hole bored through a rigid body. By this circular hole 64, the thin-walled portions 43,43' of the parallel plate structure are defined. The right half part of the parallel plate structure is omitted in the figure [this also applies to FIGS. 25(b) through 25(c)]. In FIG. 25(b), numeral 65 indicates small circular holes bored respectively through upper and lower edge portions of a rigid body in a precisely opposed relation, and numeral 66 designates a straight slot extending between these two circular holes 65,65. By these holes 65 and the slot 66, the thin-walled portions 43,43' of the parallel plate structure are defined. In FIG. 25(c), designated at numeral 67 is a substantially elliptical hole bored through a rigid body and extending close to the upper and lower edge portions of the rigid body. By this hole 67, the thin-walled portions 53,53' of the radial plate structure are defined. Turning next to FIG. 25(d), numeral 68 indicates small circular holes bored in upper and lower edge portions of a rigid body in a precisely-opposed relation, and numeral 69 designates a straight slot extending between these two circular holes 68,68. The thin-walled portions 53,53' of the radial plate structure are defined by these holes 68,68 and the slot 69.

As described above, the thin-walled portions 43,43',53,53' shown respectively in FIGS. 25(a) through 25(d) are not uniform in longitudinal thickness, whereby it is of course understood that the forms of the portions 43,43';53,53' are not symmetrical. However, they still exhibit the same effects as the parallel plate structures shown respectively in FIG. 22(a) and FIG. 24(a) and the radial plate structures depicted in FIGS. 23(a) and 24(c). By the way, the thin-walled portions 43,43',53,53' are not uniform in thickness as described above. It is therefore not fully appropriate to call them plates. However, these thin-walled portions 43,43',53,53' have the same flexible function as the planar thin-walled portions depicted in FIGS. 22(a), 23(a), 24(a) and 24(c). No problems will thus arise when the thin-walled portions 3,43',53,53' are considered to be equivalent to the planar thin-walled portions shown in these figures. Accordingly, thin-walled portions having non-uniform wall thicknesses such as those depicted in the above-mentioned figures will hereinafter be deemed as planer thin-walled portions. Hence, the terms "parallel plate structure" and "radial plate structure" should be interpreted to embrace therein parallel plate structures and radial plate structures having such non-uniform wall thicknesses, besides those having uniform wall thicknesses.

Certain basic structures and characteristic properties of a parallel plate structure as well as those of a radial plate structure have been described above. Inventions making use of such plate structures are disclosed in Japanese Patent Publication No. 7657/1982 and Japanese Patent Laid-open No. 88631/1983. Namely, Japanese Patent Publication No. 7657/1982 discloses a 3-axis load meter equipped with load detection elements, each of which makes use of a parallel plate structure, arranged respectively along the X-axis, Y-axis and Z-axis. On the other hand, Japanese Patent Laid-open No. 88631/1983 discloses a thrust/torque meter constructed by arranging a parallel plate structure and a radial plate structure of a special shape with their standard axes coincided. They may be considered as sorts of multi-axis load sensors. However, they all served to detect only the direction and magnitude of each force or to detect force and moment separately. They were unable to detect the point of action of an applied force. With a view toward additionally imparting this function, it has been proposed in the specification and drawings of Japanese Patent Laid-open No. 62497/1985 (corresponding to U.S. patent application Ser. No. 605,212 of Apr. 30, 1984 and European Patent Application No. 84200591.0) to provide a multi-axis load sensor which makes use of one or more parallel plate structures and at least one radial plate structure. Such a sensor can detect not only the direction and magnitude of each load, but also its point of action. Compared with the special radial plate structure disclosed in Japanese Patent Laid-open No. 88631/1983 and composed of planar plates arranged with an equal angular interval, the moment detection element depicted in FIG. 24(a) has such a new characteristic feature as it is easy to form a laminated structure, although the special radial plate structure and the moment detection element are coincided in their principal functions that they detect moments. Such a moment detection element has also been proposed in the specification and drawings of Japanese Patent application No. 162527/1983, which was laid open under No. 55239/1985.

The above-described various multi-axis load sensors, each of which employs one or more parallel plate structures and one or more radial plate structures, are each satisfactorily useful for actual applications and are thus actually used in apparatus. They are, however, accompanied by the following shortcomings.

(1) It is necessary to provide parallel or radial plate structures as many as the number of force and/or moment components to be detected. If there are as many as 5 or 6 axes, it becomes usually difficult to combine such many plate structures into a unit.

(2) The multi-axis load sensor shown in the above referred-to Japanese Patent Laid-open No. 62497/1985 (corresponding to U.S. patent application Ser. No. 605,212 of Apr. 30, 1984 and European Patent Application No. 84200591.0) has ingeniously materialized the above combination. However, it requires a high machining cost.

(3) When many load components are taken into consideration, deformations at the detecting parts of the respective components may be summed up to such an extent that the resulting overall deformation cannot be ignored, although such deformations may be small when taken individually.

OBJECT OF THE INVENTION

The present invention has been completed with the foregoing circumstances in view. An object of the present invention is therefore to provide a multi-axis load sensor which is simple in structure and easy to machine.

SUMMARY OF THE INVENTION

In order to attain the above object, the present invention provides a multi-axis load sensor composed of at least one of a parallel plate structure connecting two members to each other by means of a plurality of flexible beams arranged in parallel to one another and a radial plate structure connecting the two members to each other by means of a plurality of flexible beams arranged radially relative to a given point and equipped with detection means for detecting deformations of the associated flexible beams. The deformations are of the bending deformation mode and are developed by a load applied to the associated flexible beams. At least one of the associated flexible beams is provided with another detection means for detecting deformations of a deformation mode different from the bending deformation mode.

The multi-axis load sensor of this invention is constructed by at least either one of a parallel plate structure and a radial plate structure, each of which is provided with a plurality of detection means capable of detecting separately typical deformation modes to be developed corresponding respectively to exerted plural load components. It is thus possible to detect a plurality of load components with a simple structure. Besides, it is easy to machine. It requires rather fewer deformable portions, compared with the number of load components to be detected. Therefore, it is feasible to obtain a multi-axis load sensor having high rigidity as an overall sensor. Furthermore, the present invention permits well-balanced designing which conforms to a variety of requirements and specifications.

BRIEF DESCRIPTION OF THE DRAWINGS

The above and other objects, features and advantages of the present invention will become apparent from the following description and the appended claims, taken in conjunction with the accompanying drawings, in which:

FIG. 4 is a side view showing a deformation which takes place when the moment $M_Y$ is applied to a symmetrical parallel plate structure;

FIGS. 5(a), 5(b), 5(c) and 5(d) are front view, side view, top plan view and bottom plan view of a multi-axis load sensor according to a second embodiment of this invention;

DETAILED DESCRIPTION OF THE PRESENTLY PREFERRED EMBODIMENTS

The present invention will hereinafter be described based on the embodiments shown in the accompanying drawings. Prior to proceeding with the description of the embodiments, the fundamental concept of this invention will, however, be described in brief. As already described above, the parallel plate structure and radial plate structure undergo bending deformations easily by their corresponding specific load components [i.e., by the force $F_Z$ depicted in FIG. 22(b) and the moment $M_Y$ shown in FIG. 23(b) respectively] but have relatively high rigidity against the other load components. The multi-axis load sensor proposed in Japanese Patent Laid-open No. 62497/1985 (corresponding to U.S. patent application Ser. No. 605,212 of Apr. 30, 1984 and European Patent application No. 84200591.0) makes use of a radial plate structure or suitably-combined use of a radial plate structure and a parallel plate structure so as to detect only load components which cause them to undergo bending deformations, through the bending deformations. Although the parallel plate structure and the radial plate structure have been described as having relatively high rigidity against the above-mentioned other load elements, they cannot avoid development of some deformations such as twisting deformations, expansion and contraction deformations, etc. when said other load components are applied. As long as the construction principle of the multi-axis load sensor disclosed in the above-mentioned Japanese Patent Laid-open No. 62497/1985 is followed, it is hence impossible to detect correct loads unless signals detected by deformations other than the above-described bending deformations are removed as much as possible.

In the course of an experiment on the above-described multi-axis load sensor, the present inventors have come up with an approach which is quite opposite to the above-mentioned way of thinking. Namely, opposite to the above-described multi-axis load sensor, it may be contemplated to make use of signals which are detected through deformations and must be removed as much as possible in the above-described multi-axis load sensor, so that the above-mentioned other load components can also be detected. The present invention has been completed in accordance with such a thought. In the present invention, the parallel plate structure and/or the radial plate structure is provided with detection means for detecting not only bending deformations but also other deformations such as twisting deformations, expansion and contraction deformations and the like. The embodiments of this invention will next be described.

The First Embodiment

Figure 22A:
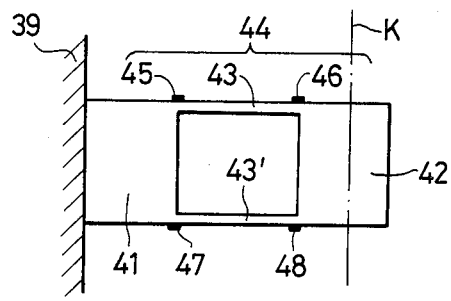
FIGS. 22(a), 22(b) and 22(c) are side views of a parallel plate structure.

FIGS. 1(a), 1(b), 1(c) and 1(d) are front view, side view, upper plan view and lower plan view of a multi-axis load sensor according to a first embodiment of this invention. In these figures, there are illustrated a fixed portion 1 made of a rigid material and a movable portion 2 formed of a rigid material. Loads are applied to the movable portion 2. Numeral 3,3' indicate thin-walled portions which connect the fixed portion 1 and the movable portions 2 to each other. These thin-walled portions 3,3' are arranged in parallel to each other. Designated at numeral 4 is a parallel plate structure which includes the thin-walled portions 3,3'. Numeral 5 indicates a support portion which supports the fixed portion 1 thereon. This structure is the same as that illustrated as an exemplary prior art structure in FIG. 22(a).

Figure 1C:
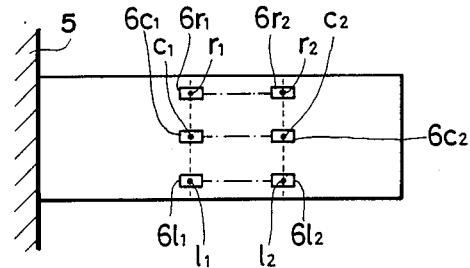
FIGS. 1(a), 1(b), 1(c) and 1(d) are front view, side views, top plan view and bottom plan view of a multi-axis load sensor according to a first embodiment of this invention.
Figure 1A:
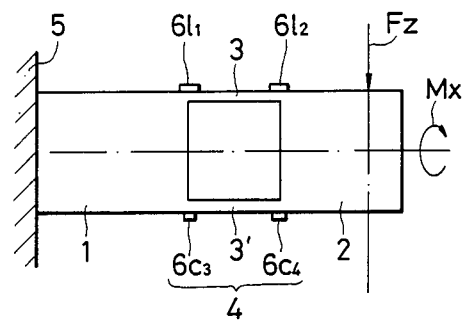
Figure 1B:
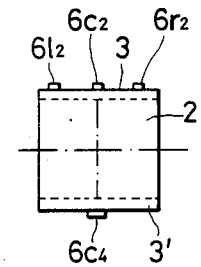
Figure 1D:
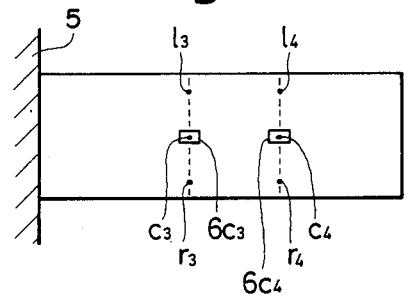

Here, the names of respective coordinate axes in the above-described parallel plate structure are determined. In FIG. 1(a), the vertical axis (the Z-axis) is to be called the standard axis because this structure is most suitable for the detection of the force $F_Z$ in the direction of the Z-axis. Also in FIG. 1(a), the horizontal axis (the X-axis) is to be called the central axis and the axis extending perpendicularly to the drawing sheet(i.e., the Y-axis), namely, the axis extending at right angles relative to both of the standard axis and the central axis is to be called the perpendicular axis (these names will also be used in each embodiment, description of which will follow).

Reference letters $c_1$, $c_2$, $r_1$, $r_2$, $l_1$ and $l_2$ indicate various points on the upper surface of the parallel plate structure 4. These points are all located at portions where the thin-walled portion 3 and the fixed and movable portions 1,2 are connected together. Similarly, reference letters $c_3$, $c_4$, $r_3$, $r_4$, $l_3$ and $l_4$ indicate various points on the lower surface of the parallel plate structure 4. These points are all located at portions where the thin-walled portion 3' and the fixed and movable portions 1,2 are connected together. Designated at $6c_1$, $6c_2$, $6c_3$, $6c_4$, $6r_1$, $6r_2$, $6l_1$ and $6l_2$ are strain gauges provided respectively at the points $c_1$, $c_2$, $c_3$, $c_4$, $r_1$, $r_2$, $l_1$ and $l_2$. The resistance values of these strain gauges vary depending on strains produced at their corresponding points. Plural sets of bridge circuits are constructed by these strain gauges. It is in the provision of such plural sets of bridge circuits that this embodiment is different from convention examples.

Figure 22B:
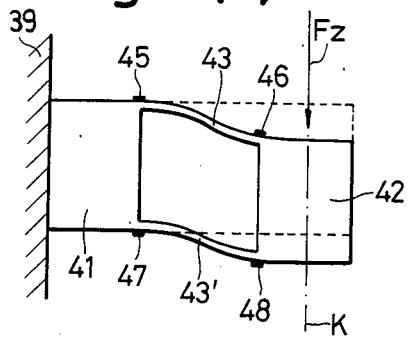

When the force $F_Z$ is applied along the standard axis in the above parallel plate structure 4, the parallel plate structure 4 is deformed with the same bending deformation mode as the above-described deformation shown in FIG. 22(b). In this case, the cross-sections at the above-described various points are all the same. In addition, the strain guages are symmetrically positioned relative to the thin-walled portions 3,3'. Therefore, the absolute values of strains to be produced in the respective strain gauges will be equal to one another.

Figure 22C:
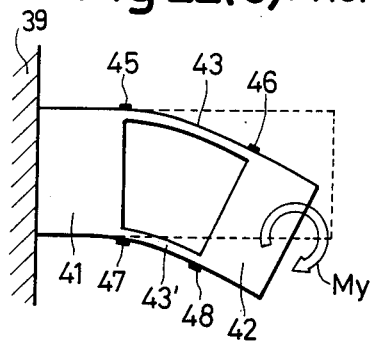

When the moment $M_Y$ is applied to the parallel plate structure 4 about the perpendicular axis thereof on the other hand, the parallel plate structure 4 is relatively rigid against the moment $M_Y$. When the moment $M_Y$ is exerted with a still greater magnitude, the thin-walled portions 3,3' however undergo the same deformations as those depicted in FIG. 22(c). Due to these deformations, a tensile or compression strain is developed in each strain gauge. The absolute values of these tensile and compression strains are equal to one another for the reasons mentioned above.

Figure 2:
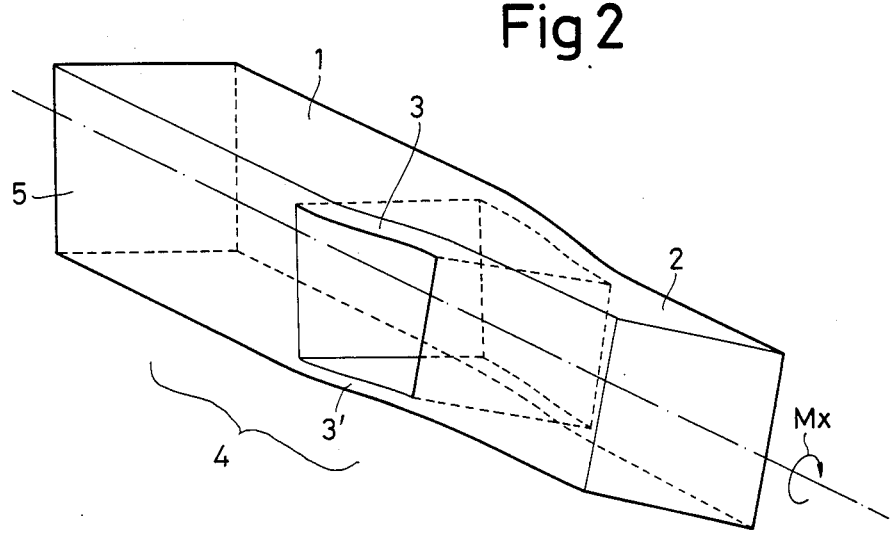
FIG. 2 is a perspective view showing the multi-axis load sensor shown in each of FIGS. 1(a), 1(b), 1(c) and 1(d) when the multi-axis load sensor has undergone a twisting deformation about its central axis.

When the moment $M_X$ is applied to the parallel plate structure 4 about the central axis thereof, the parallel plate structure 4 shows high rigidity against the moment $M_X$. When the moment $M_X$ is exerted with a still greater magnitude, such twisting deformations as shown in FIg. 2 are, however, developed in the thin-walled portions 3,3'. As already mentioned above, the strain gauges $6c_1$–$6c_4$ provided at the central parts are not subjected to strains by the above twisting deformations but the strasin gauges $6r_1, 6r_2, 6l_1, 6l_2$ provided respectively on the both sides of the central parts are strained as clearly envisaged also from FIG. 2. The absolute values of tensile strains among such strains are equal to each other, whereas those of compression strains among such strains are also equal to each other.

The above-described strains of the respective strain gauges by the force $F_Z$ and moments $M_Y, M_X$ will be summarized in the following table, in which the signs "+" "−" indicate tensile strain and compression strain respectively and the numeral "0" indicates no development of strain.

| Load | Gauge | | | | | | | |
|---|---|---|---|---|---|---|---|---|
| | $6c_1$ | $6c_2$ | $6c_3$ | $6c_4$ | $6r_1$ | $6r_2$ | $6l_1$ | $6l_2$ |
| $F_Z$ | + | − | − | + | + | − | + | − |
| $M_X$ | 0 | 0 | 0 | 0 | + | − | − | + |
| $M_Y$ | + | + | − | − | + | + | + | + |

Figure 3:
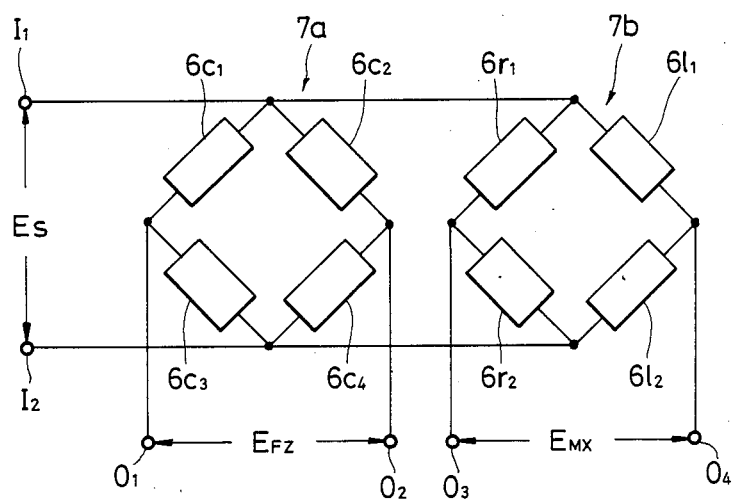
FIG. 3 is a circuit diagram of a detection circuit for the multi-axis load sensor shown in each of FIGS. 1(a), 1(b), 1(c) and 1(d)

The strains which have been produced in the respective strain gauges as mentioned above are then processed by a detection circuit illustrated in FIG. 3.

FIG. 3 is a circuit diagram of a detection circuit for the multi-axis load sensor depicted in illustrated power source terminals $I_1, I_2$ for g a constant voltage $E_S$, output terminals $O_1, O_2, O_3, O_4$, a first bridge circuit 7a composed of strain gauges $6c_1, 6c_2, 6c_3, 6c_4$, and a second bridge circuit 7b composed of strain gauges $6r_1, 6r_2, 6l_1, 6l_2$.

When the force $F_Z$ is applied to the parallel plate structure 4, the strain gauges $6c_1, 6c_4$ are subjected to tensile strains, whereas the strain gauges $6c_2, 6c_3$ are subjected to compression strains. As a result, owing to the characteristics of the first bridge circuit 7a, a signal $E_{FZ}$ corresponding to the force $F_Z$ is output between the output terminals $O_1, O_2$. Also, the strain gauges $6r_1, 6l_1$ are subjected to tensile strains whereas the strain gauges $6r_2, 6l_2$ are subjected to compression strains. Therefore, owing to the characteristics of the second bridge circuit 7b, these tensile strains and compression strains are cancelled out and no output (namely, output=0) is thus produced between the output terminals $O_3, O_4$. Consequently, upon application of the force $F_Z$, a signal $E_{FZ}$ corresponding to the force $F_Z$ is output from the detection circuit.

When the moment $M_X$ is then applied with a greater magnitude to the parallel plate structure 4 as mentioned above, the strain gauges $6r_1, 6l_2$ are subjected to tensile strains while the strain gauges $6r_2, 6l_1$ are subjected to compression strains. Accordingly, a signal $E_{MX}$ corresponding to the moment $M_X$ is output between the output terminals $O_3, O_4$ of the second bridge circuit 7b. On the other hand, the strain gauges $6c_1$–$6c_4$ arranged at the central parts are kept free from strains. Therefore, the output between the output terminals $O_1, O_2$ of the first bridge circuit 7a remains at 0. Consequently, the signal $E_{MX}$ corresponding to the moment $M_X$ is output from this detection circuit.

When the moment $M_Y$ is exerted with a greater magnitude to the parallel plate structure 4, the strain gauges $6c_1, 6c_2$ are subjected to tensile strains while the strain gauges $6c_3, 6c_4$ are subjected to compression strains. However, these strains are cancelled out by the first bridge circuit 7a. On the other hand, the strain gauges $6r_1, 6r_2, 6l_1, 6l_2$ are all subjected to tensile strains. These strains are however cancelled out by the second bridge circuit 7b. Consequently, no signal is output from this detection circuit even when the moment $M_Y$ is exerted with such a greater magnitude and the thin-walled portions 3,3' are thus deformed.

As already mentioned above, the parallel plate structure 4 has extremely high rigidity against the force $F_X$ applied along the central axis, the force $F_Y$ applied along the perpendicular axis and the moment $M_Z$ applied about the standard axis. Furthermore, the moment $M_Y$ about the perpendicular axis is cancelled out by the above-described bridge circuit. Hence, the multi-axis load sensor of this embodiment in which strain gauges are provided in the above-described manner serves as a 2-axis load sensor which can detect the force $F_Z$ applied along the standard axis and the moment $M_X$ exerted about the central axis.

Figure 24:
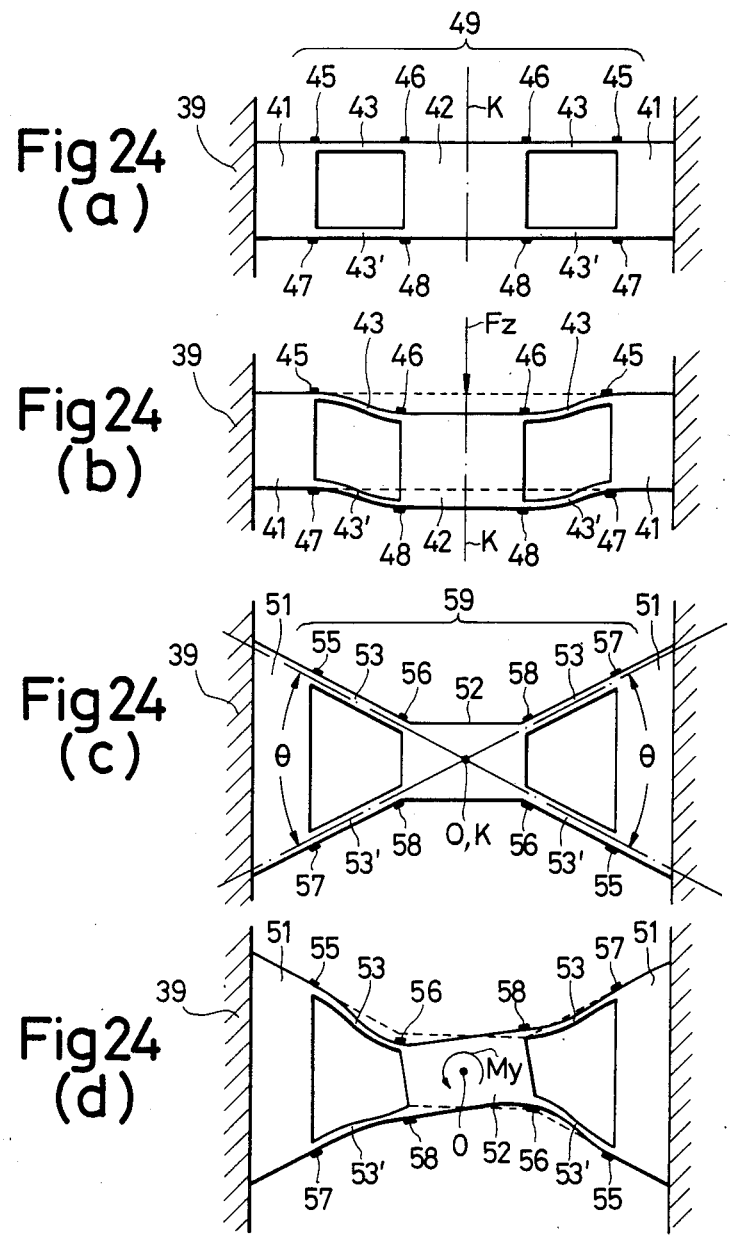
FIGS. 24(a), 24(b), 24(c) and 24(d) are side views of another parallel plate structure and radial plate structure.
Figure 25:
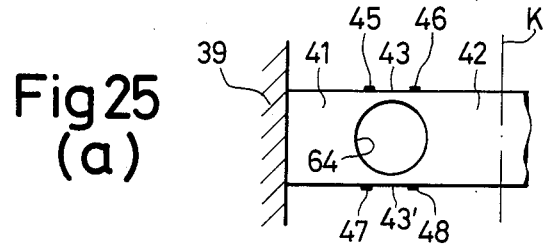
FIGS. 25(a), 25(b), 25(c) and 25(d) are side views of further parallel plate structure and radial plate structure.
Figure 25:
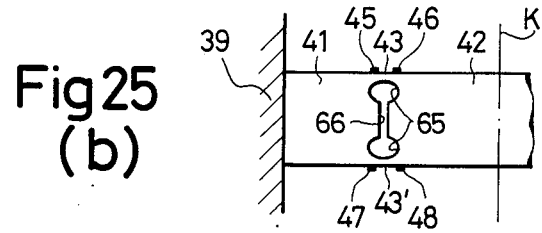
Figure 25:
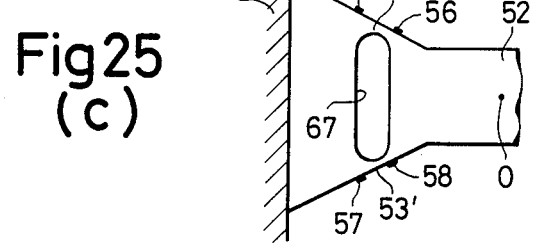
Figure 25:
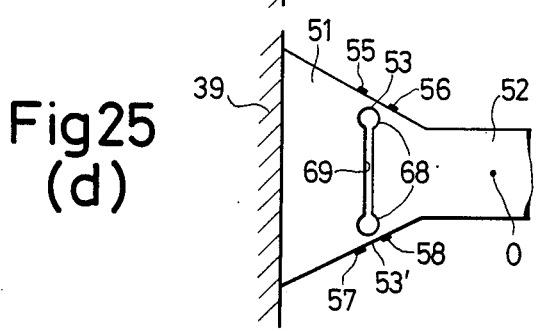

Description has been made on the parallel plate structure 4 of the type shown in FIG. 1(a) through FIG. 1(d). The same description may also be applied to the parallel plate structure of the symmetrical shape illustrated in FIG. 24(a) except that the strain gauges are provided symmetrically (i.e., the number of points, where strain gauges can be provided, is doubled.). It is however necessary to make a particular note with respect to the deformation and distribution of strain which are to be produced upon application of the moment $M_Y$ to the symmetrical parallel plate structure about the perpendicular axis thereof. They will hereinafter be described with reference to FIG. 4.

FIG. 4 is a side view showing a deformation which is produced upon application of the moment $M_Y$ to the symmetrical parallel plate structure, in which like reference numerals and letters identify like elements of structure depicted in FIG. 1(a). Description on such common elements of structure is thus omitted here. Numeral 4' indicates a parallel plate structure of a symmetrical configuration. On the other hand, $6d_1$–$6d_4$ indicate strain gauges and their corresponding strain gauges are designated at $6c_1$–$6c_4$ respectively. In the figure, the deformation by the moment $M_Y$ is shown in an exaggerated fashion.

Let's now consider a situation in which the moment $M_Y$ is exerted about the perpendicular axis. In the case of the one-half parallel plate structure 4 shown in FIG. 1(a), it undergoes such an elongation/compression deformation mode that the thin-walled portion 3 is elongated while the thin-walled portions 3' is compressed. In the case of the symmetrical parallel plate structure 4' illustrated in FIG. 4, a tendency of the point 0 to move to the point 0' such as that seen in the case of the parallel plate structure 4 is restrained by the other parallel plate structure. Whereby, a force $F_Z$ in the direction of the standard axis will pull back the point 0, which has moved to the point 0', to its original center. The same relation is also applied to the parallel plate structure on the opposite side. Therefore, these two imaginary forces are balanced as internal forces and do not come out externally. For the reasons mentioned above, the deformations of the thin-walled portions 3,3' are of the combination of an elongation/compression deformation mode and a bending deformation mode. These strains produced in the respective strain gauges solely in accordance with the elongation/compression deformation mode result in elongation of the strain gauges $6c_1,6c_2,6d_3,6d_4$ and in compression of the strain gauges $6d_1,6d_2,6c_3,6c_4$ upon application of the moment $M_Y$ shown in the drawing. These elongation and compression are small in their extents. However, strains caused in accordance with the bending deformation mode caused by the internal imaginary forces applied in opposite directions along the standard axis (in other words, the elongation strains of the strain gauges $6c_2,6c_3,6d_1,6d_4$ and the compression strains of the strain gauges $6c_1,6c_4$, $6d_2$, $6d_3$) are greater compared with their corresponding strains caused in accordance with the above-described elongation/compression deformation mode. Therefore, the mode of the actual distribution of strains is the same as the bending deformation mode which takes place when the respective unit parallel plate structures are subjected to the forces $F_Z$ in the positive and negative directions, respectively. These strains are not so great, since the parallel plate structure 4' is rigid against the moment $M_Y$. When constructing, with the symmetrical parallel plate structure 4', a 2-axis load sensor for detecting the force $F_Z$ and the moment $M_X$, it is, however, necessary with such strains in view to compose a bridge circuit which can avoid the influence of the moment $M_Y$. As the opposite example, where the symmetrical parallel plate structure 4' is positively utilized for detecting the moment $M_Y$, is shown as the second embodiment. The typical deformation of the symmetrical parallel plate structure 4' caused by the moment $M_Y$, shown in FIG. 4, is hereinafter called "the deformation which contains elongation/compression deformation mode".

The multi-axis load sensor according to the first embodiment has been described above. The points where strain gauges are provided are however not limited to the above-exemplified ones. Exactly the same results can be obtained when strain gauges are provided at points $r_4,r_3,l_4,l_3$ instead of the points $r_1,r_2,l_1,l_2$.

In the present embodiment, the plurality of strain gauges are provided at the predetermined points on the parallel plate structure, the plural sets of suitable bridge circuits are formed with these strain gauges, and deformations by moments about the central axis (which deformations have conventionally been excluded from consideration as those affecting deleteriously on the detection of loads) are positively detected as described above. It is therefore possible to detect both forces applied along the standard axis and moments exerted about the central axis separately by means of the basic parallel plate structure of the simple construction. When the multi-axis load sensor is employed as a sensor for detecting loads to be applied to the hand of a robot for the control of the robot, the following advantageous effects can be brought about. In the case of a robot, loads are in many instances applied at points remote from the center of its load sensor. Thus, large moments are applied to the sensor. In this case, the sensor is required to detect such large moments. According to the present embodiment, these large moments can be detected without failure as can be readily understood from the foregoing description.

The Second Embodiment

FIGS. 5(a), 5(b), 5(c) and 5(d) are front view, side view, top plan view and bottom plan view of a multi-axis load sensor according to a second embodiment of this invention. In these drawings, like reference numerals and letters identify like elements - of structure illustrated in FIGS. 1(a) through 1(d). Reference letters $r_{11}$, $r_{21}$, $l_{11}$ and $l_{21}$ indicate various points on the upper surface of the parallel plate structure 4. These points are all located at portions where the thin-walled portion 3 and the fixed and movable portions 1,2 are connected together. Similarly, reference letters $r_{31}$, $r_{41}$, $l_{31}$ and $l_{41}$ indicate various points on the lower surface of the parallel plate structure 4. These points are all located at portions where the thin-walled portion 3' and the fixed and movable portions 1,2 are connected together. The points $r_{11},r_{21},r_{31},r_{41},l_{11},l_{21},l_{31},l_{41}$ are different from the points $r_1,r_2,r_3,r_4,l_1,l_2,l_3,l_4$ of the first embodiment in that the former points are located near a central part extremely close to the points $c_1,c_2,c_3,c_4$. Designated at $6r_{11}$, $6r_{31}$, $6l_{21}$ and $6l_{41}$ are strain gauges provided respectively at the points $r_{11},r_{31},l_{21},l_{41}$.

When the force $F_Z$ is applied along the standard axis in the parallel plate structure, the thin-walled portions 3,3' are deformed in the bending deformation mode as described above. In this case, the absolute values of the tensile strains and the compression strains which are applied to the respective strain gauges become equal to one another for the same reasons as mentioned in connection with the first embodiment. When the moment $M_Y$ is exerted on the parallel plate structure 4 about the perpendicular axis thereof on the other hand, the parallel plate structure 4 exhibits relatively high rigidity against this moment $M_Y$. When the moment $M_Y$ is then applied with a greater magnitude, the thin-walled portions 3,3' undergo the same deformations as mentioned above, and the respective strain gauges thus develop tensile or compression strains. The absolute values of these tensile and compression strains are also equal to one another for the reasons mentioned in connection with the first embodiment. When the moment $M_X$ is applied to the parallel plate structure 4 about the central axis thereof, the parallel plate structure 4 shows high rigidity against this moment $M_X$. When the moment $M_X$ is applied with a greater magnitude, the thin-walled portions 3,3' undergo such twisting deformations as shown in FIG. 2. Even by these twisting deformations, the strain gauges $c_1$–$c_4$ provided at the central part do not develop strains, and the other strain gauges provided adjacent to the above strain gauges develop only very slight tensile strains and compression strains. The absolute values of these tensile and compression strains are equal to one another for the same reasons mentioned above with respect to the first embodiment.

The above-described strains of the respective strain gauges by the the force $F_Z$ and the moments $M_Y,M_X$ will be summarized in the following table in the same way as in the first embodiment.

| Load | Gauge | | | | | | | |
|---|---|---|---|---|---|---|---|---|
| | $6c_1$ | $6c_2$ | $6c_3$ | $6c_4$ | $6r_{11}$ | $6r_{31}$ | $6l_{21}$ | $6l_{41}$ |
| $F_Z$ | + | − | − | + | + | − | − | + |
| $M_Y$ | + | + | − | − | + | − | + | − |
| $M_X$ | 0 | 0 | 0 | 0 | + | − | + | − |

Figure 6:
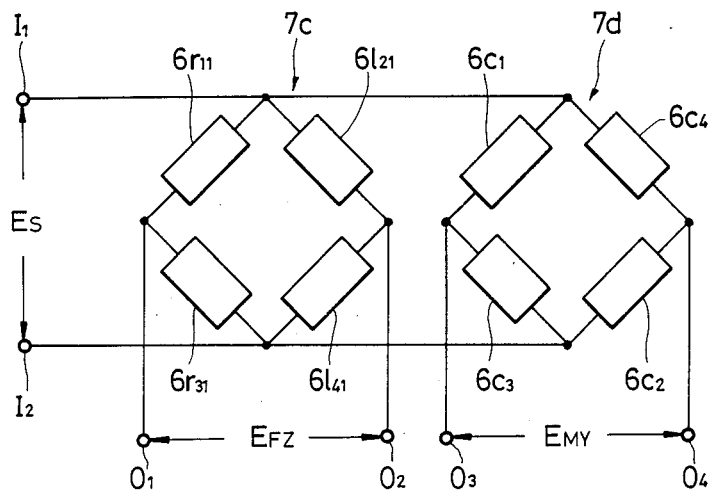
FIG. 6 is a circuit diagram of a detection circuit for the multi-axis load sensor depicted in each of FIGS. 5(a), 5(b), 5(c) and 5(d)

FIG. 6 is a circuit diagram of a detection circuit for the multi-axis load sensor illustrated in FIGS. 5(a) through 5(d). Designated at 7c is a first bridge circuit composed of strain gauges $6r_{11},6r_{31}, 6l_{21},6l_{41}$. $O_3$ and $O_4$ indicate output terminals for the first bridge circuit 7c. Numeral 7d indicates a second bridge circuit composed of strain gauges $6c_1$, $6c_2,6c_3,6c_4$. $O_3$ and $O_4$ indicate output terminals for the second bridge circuit 7d.

When the force $F_Z$ is applied to the parallel plate structure 4, tensile strains are produced in the strain gauges $6r_{11},6l_{41}$, whereas compression strains are developed in the strain gauges $6r_{31},6l_{21}$. Owing to the characteristics of the first bridge circuit 7c, a signal $E_{FZ}$ corresponding to the force $F_Z$ is output between the output terminals $O_1,O_2$. On the other hand, tensile strains occur in the strain gauges $6c_1,6c_4$, while compression strains occur in the strain gauges $6c_2,6c_3$. Owing to the characteristics of the second bridge circuit 7d, these strains are cancelled out, and no output (output=0) is generated between the output terminals $O_3,O_4$.

When the moment $M_Y$ is applied with a greater magnitude to the parallel plate structure 4, tensile strains are developed in the strain gauges $6r_{11},6l_{21}$, whereas compression strains are produced in the strain gauges $6r_{31},6l_{41}$. Owing to the characteristics of the first bridge circuit 7c, these strains are cancelled out, and no output (output=0) is generated between the output terminals $O_1,O_2$. On the other hand, tensile strains are produced in the strain gauges $6c_1,6c_2$, while compression strains are produced in the strain gauges $6c_3,6c_4$. Owing to the characteristics of the second bridge circuit 7d, the signal $E_{MY}$ corresponding to the moment $M_Y$ is output between the output terminals $O_3, O_4$.

When the moment $M_X$ is applied with a greater magnitude to the parallel plate structure 4 as mentioned above, there is developed such a twisting deformation as illustrated in FIG. 2. Since all the strain gauges are provided substantially at the central part as shown in FIGS. 5(b), 5(c) and 5(d), strains developed in the strain gauges by the twisting deformation are however so small that they can be ignored. In some instances, it may not be feasible to use strain gauges significantly small compared with the widths of the thin-walled portions 3,3′. In this case, no strains are produced in the strain gauges $6c_1$–$6c_4$, but tensile and compression strains are developed respectively in the strain gauges $6r_{11},6l_{21}$ and in the strain gauges $6r_{31},6l_{41}$. However, these strains are cancelled out owing to the characteristics of the first bridge circuit 7c, and no output (output=0) is generated between its output terminals $O_1,O_2$.

As earlier remarked, the parallel plate structure 4 shows high rigidity against the forces $F_X$, $F_Y$ and the moment $M_Z$. Since the output of the detection circuit is 0 for the moment $M_X$, the multi-axis load sensor capable of detecting the force $F_Z$ applied along the standard axis and the moment $M_Y$ exerted about the perpendicular axis.

The deformation of the symmetrical parallel plate structure 4′ upon application of the moment $M_Y$ has already been described in connection with the first embodiment while making reference to FIG. 4. In the case of the symmetrical parallel plate structure 4′, it is possible to make positive use of the deformation which is produced by the moment $M_Y$ and which may be considered as a deformation caused by an imaginary internal force along the standard axis for the detection of the moment $M_Y$. One example of such a detection circuit will next be described with reference to FIG. 7.

Figure 7:
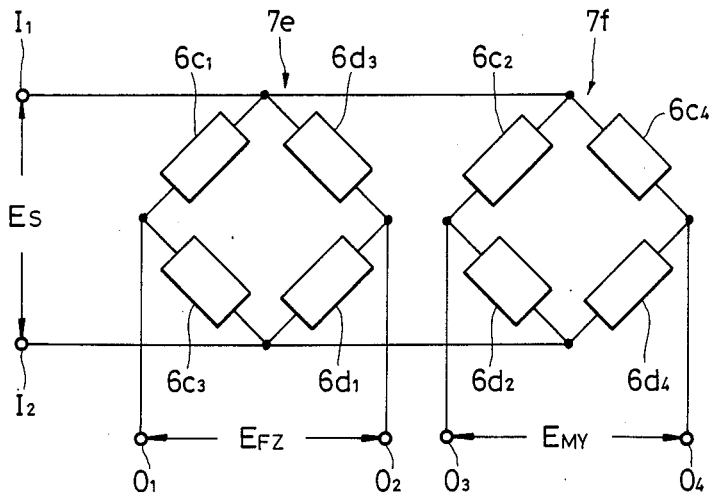
FIG. 7 is a circuit diagram of a detection circuit for a multi-axis load sensor making use of a symmetrical parallel plate structure.
Figure 8C:
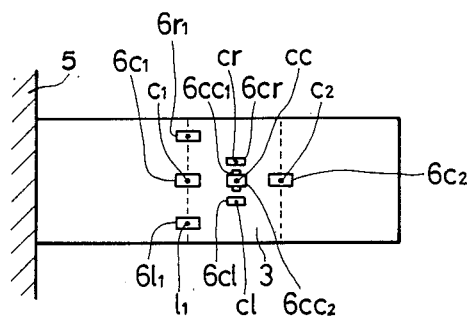
FIGS. 8(a), 8(b), 8(c) and 8(d) are respectively front view, side view, top plan view and bottom plan view of a multi-axis load sensor according to a third embodiment of this invention.
Figure 8A:
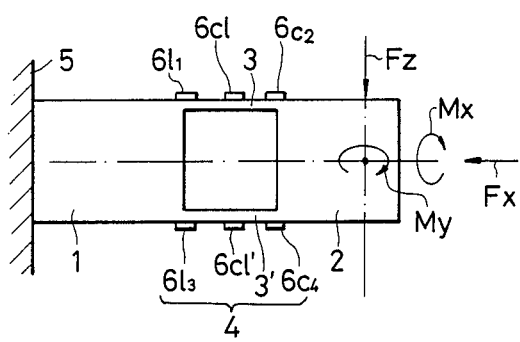
Figure 8B:
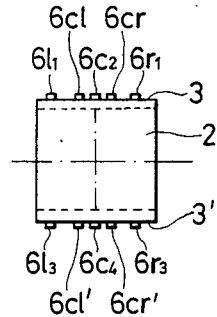
Figure 8D:
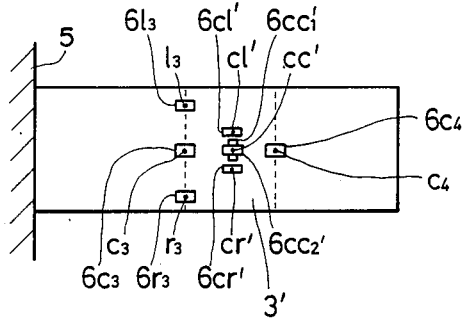

FIG. 7 is a circuit diagram of a detection circuit for a multi-axis load sensor making use of a symmetrical parallel plate structure, in which like reference numerals and letters identify like elements of structures shown respectively in FIG. 3, FIG. 4 and FIG. 6. Designated ata 7e is a first bridge circuit composed of strain gauges $6c_1,6c_3,6d_1,6d_3$, while 7f indicates a second bridge circuit formed of strain gauges $6c_2,6c_4,6d_2,6d_4$.

Description will next be made, with reference to FIG. 4, on strains to be produced in the respective strain gauges when the force $F_Z$ and the moments $M_Y,M_X$ are exerted on the symmetrical paralled plate structure. When the force $F_Z$ is applied downwards in the figure along the standard axis to the movable portions 2, tensile strains are developed in the strain gauges $6c_1,6c_4,6d_a,6d_4$, and compression strains are produced in the strain gauges $6c_1,6c_3,6d_1,6d_3$. When the moment $M_y$ is applied about the perpendicular axis to the movable portion 2, the symmetrical parallel plate structure 4′ undergoes such a deformation as illustrated in FIG. 4 owing to an imaginary internal force produced in the direction of the standard axis. Therefore, tensile strains are produced in the strain gauges $6c_2,6c_3,6d_1,6d_4$ and compression strains are developed in the strain gauges $6c_1,6c_4,6d_2,6d_3$. When the moment $M_X$ is applied about the central axis to the movable portion 2, the symmetrical parallel plate structure 4′ undergoes a deformation which is similar to the seformation illustrated in FIG. 2. Since all the strain gauges are provided at the central part, no strains are, however, produced by the moment $M_X$. The above-described strains of the respective strain gauges by the force $F_X$ and the moments $M_Y,M_X$ will be summarized in the following table in the same way as in the first embodiment.

| Load | Gauge | | | | | | | |
|---|---|---|---|---|---|---|---|---|
| | $6c_1$ | $6c_2$ | $6c_3$ | $6c_4$ | $6d_1$ | $6d_2$ | $6d_3$ | $6d_4$ |
| $F_Z$ | + | − | − | + | + | − | − | + |
| $M_Y$ | − | + | + | − | + | − | − | + |
| $M_Z$ | 0 | 0 | 0 | 0 | 0 | 0 | 0 | 0 |

Owing to the characteristics of each of the bridge circuits shown in FIG. 7, a signal $E_{FX}$ corresponding to the force $F_Z$ is output between the output terminals $O_1,O_2$ of the first bridge circuit 7e upon application of the force $F_X$ to the symmetrical parallel plate structure. On the other hand, the second bridge circuit 7 are cancelled out, and no output (output=0) is generated between the output terminals $O_3,O_4$. When the moment $M_Y$ is applied to the symmetrical parallel plate structure, the strains of the respective strain gauges which make up the first bridge circuit 7e are cancelled out, and no output (output=0) is generated between the output terminals $O_3,O_4$. On the other hand, a signal $E_{MY}$ corresponding to the moment $M_Y$ is output between the output terminals $O_1,O_2$ of the second bridge circuit 7f. Needless to say, the output of each of the bridge circuits 7e,7f remains at 0 even when the moment $M_X$ is applied. In this manner, the force $F_Z$ and the moment MY are detected separately even when the parallel plate structure is of a symmetrical type.

By the way, the arrangement of the strain gauges shown in FIG. 5 is not necessarily limited to the illustrated points. Exactly the same results can also be obtained even when the strain gauges are provided for example at the points $r_{21},r_{41},l_{11},l_{31}$ in plcace of the point $r_{11},r_{31},l_{21},l_{41}$. The force $F_Z$ and the moment $M_Y$ can also be detected respectively by the first and second bridge circuits even if the first bridge circuit is composed of the strain gauges $6c_4,6c_2,6d_2,6d_4$ instead of making it up with the strain gauges $6c_1,6c_3$, $6d_3,6d_1$ and the second bridge circuit is formed of the strain gauges $6c_3,6d_3,6c_1,6d_1$ instead of making it up with the strain gauges $6c_2,6d_2,6c_4,6d_4$.

In the present embodiment, the plurality of strain gauges are provided at the predetermined points on the parallel plate structure, the plural sets of suitable bridge circuits are formed with these strain gauges, and deformations by moments about the perpendicular axis (which deformations have conventionally been excluded from consideration) are positively detected as described above. It is therefore possible to detect both force applied along the standard axis and moment exerted about the perpendicular axis separately by means of the basic parallel plate structure of the simple construction. When this sensor is applied to a robot, it can bring about the same advantageous effects as the preceding embodiment.

The Third Embodiment

FIGS. 8(a), 8(b), 8(c) and 8(d) are respectively front view, side view, top plan view and bottom plan view of a multi-axis load sensor according to a third embodiment of this invention. In the drawings, like elements of structure as those shown in FIG. 1(a) through FIG. 1(d) are designated by like reference numerals, and their description is hence omitted. Letters cr, cc and cl indicate positions on the upper surface of the parallel plate structure 4. All of these positions cr,cc,cl lie on the central axis of the thin-walled portion 3, which central axis extends substantially along the perpendicular axis. Similarly, letters cr', cc' and cl' indicates positions on the lower surface of the parallel plate structure 4. The positions cr',cc',cl' are symmetrical to the positions cr,cc,cl relative to a plane. The positions cc,cc' lie respectively on the central axes of the thin-walled portions 3,3', which central axes extend along the central axis of the parallel plate structure 4. The positions cr,cl are extremely close to the position cc, while the positions cr',cl' are extremely close to the position cc'. Designated at numerals 6cr,6cl,6cr',6cl' are strain gauges provided respectively at the positions cr,cl,cr',cl'. On the other hand, numerals 6cc$_1$ and 6cc$_2$ indicate strain gauges provided at the position cc, and numerals 6cc$_1$, and 6cc$_2$ designate strain gauges provided respectively at the position cc'. The strain gauges 6cc$_1$,6cc$_1$, and the strain gauges 6cc$_2$,6cc$_2$, are arranged in such a way that the directions of their strains cross at a right angle.

In the parallel plate structure 4, the thin-walled portions 3,3' follow the bending deformation mode as mentioned above when the force $F_Z$ is applied along the standard axis. These deformations of the thin-walled portions 3,3' are then detected by strain gauges $6c_1,6c_2,6c_3,6c_4$. When the moment $M_Y$ is applied about the perpendicular axis to the parallel plate structure 4 on the other hand, the parallel plate structure 4 exhibits a significant degree of rigidity against the moment $M_Y$. However, when a still greater moment $M_Y$ is applied, the parallel plate structure 4 undergoes an expansion and contraction deformation of such a mode as mentioned above—namely, the thin-walled portion 3 is caused to expand, while the thin-walled portion 3' is caused to undergo contraction. These deformations are detected by the strain gauges 6cr,6cl,6cr',6cl'. When the moment $M_X$ is applied about the central axis to the parallel plate structure 4, the parallel plate structure 4 shows a high degree of rigidity against this moment $M_X$. If a still greater moment $M_X$ is applied, twisting deformations such as those depicted in FIG. 2 occur in the thin-walled portions 3,3'. These deformations are detected by the strain gauges $6r_1,6l_1,6l_3,6r_3$.

It is therefore apparent for the same reasons as those mentioned with respect to the first and second embodiments that the multi-axis load sensor of the third embodiment can detect the force $F_Z$ along the standard axis, the moment $M_Y$ about the perpendicular axis and the moment $M_X$ about the central axis. Besides, the multi-axis load sensor of the third embodiment provides a detection method which makes use of a still further deformation mode. Namely, when the force $F_X$ is applied along the central axis to the parallel plate structure 4, this force $F_X$ can also be detected. This detection will next be described.

When the force $F_X$ is applied along the central axis to the parallel plate structure 4, the thin-walled portions 3,3' undergo expansion and contraction deformations such that they are both caused to either contract or expand at the same time depending on the direction of the force $F_X$. This deformation mode is called "the expansion and contraction deformation mode by forces along the central axis". When a body is pulled in one direction, the body generally undergoes expansion in the same direction but contraction in a direction perpendicular to the former direction. When compressed in one direction on the contrary, the body undergoes contraction in that direction but expansion in a direction perpendicular to that direction. In the present embodiment, the force $F_X$ can also be detected on the basis of the expansion and contraction deformation mode by forces along the central axis.

This detection makes use of the above-mentioned phenomenon. Namely, when the tensile force $F_X$ is applied along the central axis to the parallel plate structure 4, the thin-walled portions 3,3' undergo expansion along the X-axis (tensile strains) and, at the same time, develop contraction along the Y-axis. In the present embodiment, tensile strains developed along the X-axis in the thin-walled portions 3,3' are detected by the strain gauges 6cc$_2$,6cc$_2$. At the same time, compression deformations in directions perpendicular to the tensile strains are detected by the strain gauges 6cc$_1$,6cc$_1$. By constructing an electrical bridge with these four strain gauges, the force $F_X$ is detected. When a compression force is applied along the X-axis to the parallel plate structure 4 on the contrary, the force $F_X$ can be detected in exactly the same manner—although the directions of deformations developed in the respective strain gauges are all reversed.

Incidentally, the bridge circuit constructed using all the strain gauges in the present embodiment can be formed following the bridge circuits described in connection with the first and second embodiments. Since the bridge circuit of the third embodiment is believed to be easily conceivable from the bridge circuits in the first and second embodiments, its illustration and description are omitted.

Since the strain gauges are provided respectively along the central and perpendicular axes of the parallel plate structure 4 and, in particular, substantially at the central parts of the thin-walled portions of the parallel plate structure 4 in the present embodiment, the multi-axis load sensor of the third embodiment can detect forces applied along the central axis in addition to forces applied along the standard axis and moments applied respectively about the perpendicular and the central axes. When the multi-axis load sensor of this embodiment is applied to a robot, it exhibits the same effects as those brought about in each of the preceding embodiments.

The Fourth Embodiment

Figure 9:
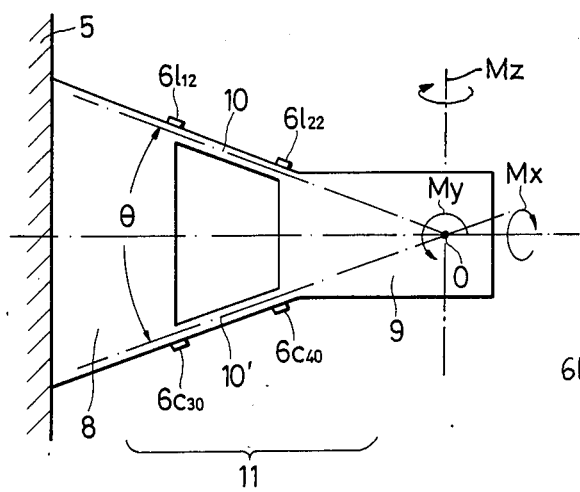
FIGS. 9(a) and 9(b) are front view and side view of a multi-axis load sensor according to a fourth embodiment of this invention.
Figure 9:
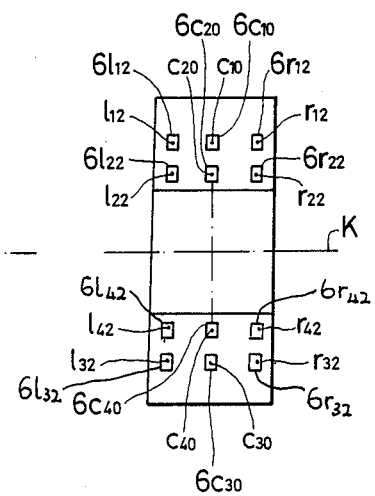

FIGS. 9(a) and 9(b) are front view and side view of a multi-axis load sensor according to a fourth embodiment of this invention, in which there are illustrated the support portion 5, fixed portion 8 supported on the support portion 5 and made of a rigid material, and a movable portion 9 made of a rigid material. Loads are applied to the movable portion 9. Designated at numerals 10,10' are thin-walled portions which connect the fixed portion 8 and the movable portion 9 to each other. These thin-walled portions 10,10' are arranged radially at a crossing angle $\theta$ and thus extend from a point O on the movable portion 9 toward the fixed portion 8. Numeral 11 indicates a radial plate structure which includes the thin-walled portions 10,10'. This radial plate structure is the same as that illustrated as a prior art example in FIG. 23(a). Here, the names of the respective coordinate axes of this radial plate structure are determined in much the same way as those determined with respect to the parallel plate structure. Since this radial plate structure is most suitable for the detection of the moment $M_Y$ about the Y-axis which extends perpendicularly to the drawing sheet, the direction of the Y-axis is chosen as the standard axis. On the other hand, the axis extending horizontally in the drawing, i.e., the X-axis is chosen as the central axis, while the Z-axis extending at right angles relative to both of these standard and central axes is chosen as the perpendicular axis.

Reference letters $c_{10}$, $c_{20}$, $r_{12}$, $r_{22}$, $l_{12}$ and $l_{22}$ indicate various points on the top surface of the radial plate structure 11. These points are all located at portions where the thin-walled portion 10 and the fixed and movable portions 8,9 are connected to each other. Similarly, designated at reference letters $c_{30}$, $c_{40}$, $r_{32}$, $r_{42}$, $l_{32}$ and $l_{42}$ are various points on the bottom surface of the radial plate structure 11. These points are all located at portions where the thin-wall portion 10' and the fixed and movable portions 8,9 are connected to each other. Designated at $6c_{10}$, $6c_{20}$, $6c_{30}$, $6c_{40}$, $6r_{12}$, $6r_{22}$, $6l_{12}$ and $6l_{22}$ are strain gauges provided respectively at the points $c_{10},c_{20},c_{30},c_{40},r_{12},r_{22},l_{12},l_{22}$. Their resistance values change depending on strains to be developed at their corresponding points. The present embodiment is different from conventional embodiments in that the plural sets of strain gauges are provided as mentioned above.

When the moment $M_Y$ is exerted about the standard axis in the radial plate structure 11, the radial plate structure 11 is deformed in the same bending deformation mode as that of the deformation described above with reference to FIG. 23(b). In this case, the cross-sections at the respective points are identical to one another, and the strain gauges are arranged at the points substantially symmetrical with respect to the thin-walled portions 10,10'. Therefore, the absolute values of the strains of the respective strain gauges are substantially equal to one another.

When the force $F_Z$ is applied in the direction of the perpendicular axis to the radial plate structure 11 on the other hand, the radial plate structure 11 is relatively rigid against this force $F_Z$. When the force $F_Z$ is exerted with a greater magnitude, the thin-walled portions 10,10' undergo the same deformations as those illustrated in FIG. 23(c). By these deformations, all the strain gauges develop tensile and compression strains, the absolute values of which are substantially equal to one another, for the same reasons as mentioned above.

When the moment $M_X$ is exerted about the central axis to the radial plate structure 11, the radial plate structure 11 exhibits high rigidity against the moment $M_X$. When the moment $M_X$ is applied with a greater magnitude, the thin-walled portions 10,10' however develop twisting deformations which are similar to those depicted in FIG. 2. In this case, the strain gauges $6c_{10}$–$6c_{40}$ provided at the central part are not subjected to strains. However, the strain gauges $6r_{12},6r_{22},6l_{12},6l_{22}$ provided respectively on both sides of the central part develop tensile and compression strains, the absolute values of which are substantially equal to one another, for the reasons mentioned above.

The above-described strains of the respective strain gauges by the the moments $M_Y,M_X$ and the force $F_Z$ will be summarized in the following table in the same way as in the first embodiment.

| Load | $6c_{10}$ | $6c_{20}$ | $6c_{30}$ | $6c_{40}$ | $6r_{12}$ | $6r_{22}$ | $6l_{12}$ | $6l_{22}$ |
|---|---|---|---|---|---|---|---|---|
| $M_Y$ | + | − | − | + | + | − | + | − |
| $M_X$ | 0 | 0 | 0 | 0 | + | − | − | + |
| $F_Z$ | + | + | − | − | + | + | + | + |

Figure 10:
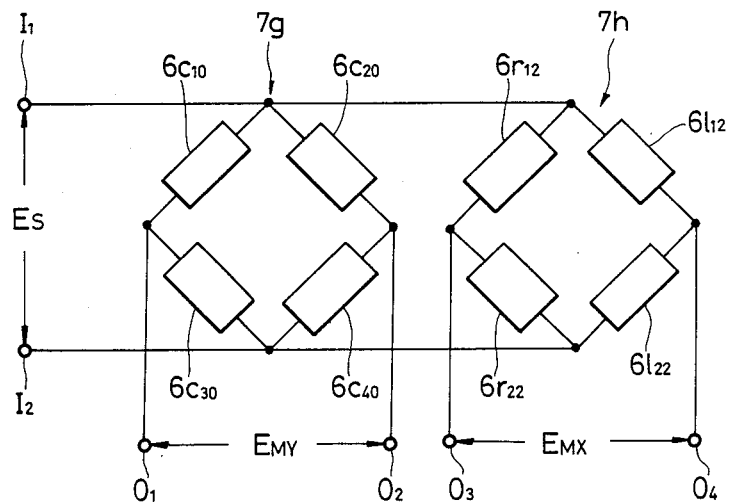
FIG. 10 is a circuit diagram of a detection circuit for the multi-axis load sensor depicted in each of FIGS. 9(a) and 9(b)

The strains developed in the respective strain gauges as mentioned above will be processed by a detection circuit illustrated in FIG. 10.

FIG. 10 is a circuit diagram of a detection circuit for the multi-axis load sensor depicted in FIGS. 9(a) and 9(b). In the figure, there are illustrated a first bridge circuit 7g composed of the strain gauges $6c_{10},6c_{20},6c_{30},6c_{40}$ and a second bridge circuit 7h constructed of the strain gauges $6r_{12},6r_{22}, 6l_{12},6l_{22}$.

Figure 23:
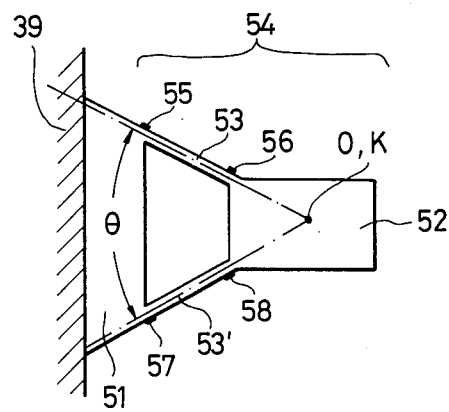
FIGS. 23(a), 23(b) and 23(c) are side views of a radial plate structure.
Figure 23:
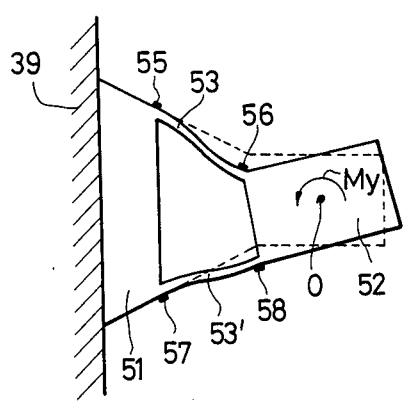
Figure 23:
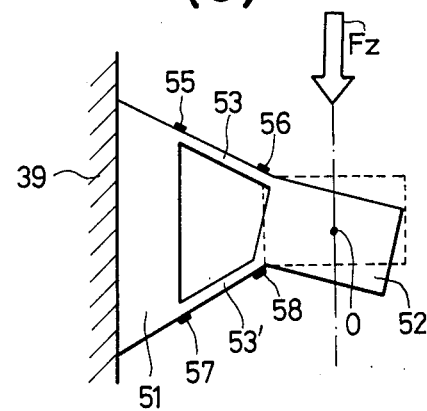

Let's now assume that the moment $M_Y$ is applied to the radial plate structure 11. As illustrated in FIG. 23(b), tensile strains are developed in the strain gauges $6c_{10},6c_{40}$, while compression strains are produced in the strain gauges $6c_{20},6c_{30}$. Owing to the characteristics of the first bridge circuit 7g, a signal $E_{MY}$ corresponding to the moment $M_Y$ is output between the output terminals $O_1,O_2$. On the other hand, tensile strains are produced in the strain gauges $6r_{12},6l_{12}$, and compression strains are developed in the strain gauges $6r_{22},6l_{22}$. Thus, owing to the characteristics of the second bridge circuit 7h, the strains of the respective strain gauges are cancelled out, thereby making the output between the output terminals $O_3, O_4$ be 0.

When the moment $M_X$ is exerted on the radial plate structure 11, tensile strains are produced in the strain gauges $6r_{12}, 6l_{22}$, and compression strains are produced in the strain gauges $6r_{22}, 6l_{12}$. Thus, owing to the characteristics of the bridge circuit 7h, a signal $E_{MX}$ corresponding to the moment $M_X$ is output between its output terminals $O_3, O_4$. On the other hand, no strains are developed in the strain gauges $6c_{10}-6c_{40}$. Therefore, the output between the output terminals $O_1, O_2$ becomes 0.

When the force $F_Z$ is applied to the radial plate structure 11, tensile and compression strains are developed respectively in the strain gauges $6c_{10}, 6c_{20}$ and the strain gauges $6c_{30}, 6c_{40}$ as shown in FIG. 23(c). Owing to the characteristics of the first bridge circuit 7g, the strains of the respective strain gauges are thus cancelled out, and the output between the output terminals $O_1, O_2$ becomes 0. On the other hand, the stains developed in the strain gauges $6r_{12}, 6r_{22}, 6l_{12}, 6l_{22}$ are all tensile strains. Owing to the characteristics of the second bridge circuit 7h, the strains of these strain gauges are cancelled out, and the output between the output terminals $O_1, O_2$ becomes 0.

The radial plate structure 11 exhibits extremely high rigidity against the force $F_Y$ applied in the direction of the standard axis, the force $F_X$ exerted in the direction of the central axis and the moment $M_Z$ exerted about the perpendicular axis. In addition, the force $F_Z$ which is applied along the perpendicular axis is cancelled by the above bridge circuit. Therefore, the multi-axis load sensor of this embodiment is a 2-axis load sensor which is adapted to detect moments $M_Y$ applied about the standard axis and moments $M_X$ exerted about the central axis.

The present embodiment has been described above, supposing that the crossing angle $\theta$ between the thin-walled portions 10,10′ of the radial plate structure 11 is an acute angle as shown in FIG. 9(a). Different situations will however arise when the crossing angle $\theta$ is an obtuse angle. The characteristics of the radial plate structure 11, that it has high rigidity against the moment $M_Z$ but is relatively susceptible of developing a twisting deformation by the moment $M_X$, are reversed, thereby being relatively susceptible of undergoing a twisting deformation by the moment $M_Z$ but showing high rigidity against the moment $M_X$. Furthermore, its characteristics that it has high rigidity against the force $F_X$ and that it is somewhat susceptible to deformation by the force $F_Z$ are also reversed, thereby being somewhat susceptible of undergoing a deformation by the force $F_X$ and showing high rigidity against the force $F_Z$. However, these fundamental relationship are exactly equal to each other. Therefore, it may be easy to conceive the structure of a bridge circuit which is to be composed of strain gauges for the above case (namely, when the crossing angle $\theta$ is an obtuse angle and the moments $M_Y, M_Z$ are to be detected).

As a special case, it may also be contemplated that the crossing angle $\theta$ is 90 degree. In this case, the radial plate structure shows medium and equal rigidity against both moments $M_X, M_Z$. When the moments $M_X, M_Z$ are very large, the radial plate structure hence undergo deformations by these moments. The radial plate structure serves as a 3-axis load sensor when the crossing angle $\theta$ is 90 degree and the moments $M_X, M_Z$ are extremely large compared with the rated value of the moment $M_Y$ as mentioned above.

By the way, the arrangement of the strain gauges is not limited to the arrangement shown in FIG. 9(b). The same results can be brought about when the strain gauges are provided at the points $r_{42}, r_{32}, l_{42}, l_{32}$ instead of the points $r_{12}, r_{22}, l_{12}, l_{22}$ and the second bridge circuit 7h is constructed by these strain gauges. In the case of a radial plate structure of the symmetrical type, it is apparent that strain gauges can also be provided on the radial plate structure, which is located at a position symmetrical to the radial plate structure 11 shown in FIGS. 9(a) and 9(b), at the symmetrical points with those of the strain gauges of the latter radial plate structure.

In the present embodiment, the plurality of strain gauges are provided at the predetermined points on the radial plate structure, the plural sets of suitable bridge circuits are formed with these strain gauges, and deformations by moments about the central axis (or about the perpendicular axis)—which deformations have conventionally been excluded from consideration—are positively detected. It is therefore possible to detect both moments exerted about the standard axis and moments exerted about the central axis (or about the perpendicular axis) separately by means of the basic radial plate structure of the simple construction. In the special case (i.e., when the crossing angle is 90 degree), it can detect moments applied respectively about the standard, central and perpendicular axes.

By the construction shown in FIGS. 9(a) and 9(b), the moment $M_z$ about the perpendicular axis can also be detected. Where the angle $\theta$ is an acute angle as shown in FIG. 9(a), the load sensor is suited as a sensor for the detection of large moments, and its sensitivity is lowered. In this case, the moments $M_X$ and $M_Z$ can be detected by providing strain gauges $6l_{32}, 6l_{42}, 6r_{32}$, and $6r_{42}$ at points $l_{32}, l_{42}, r_{32}$, and $r_{42}$, respectively, and by constructing two sets of 4-gauges Wheatstone bridges with these strain gauges and the strain gauges $6l_{12}, 6l_{22}, 6r_{12}$, and $6r_{22}$. The structure of a Wheatstone bridge for such a detection is obvious to those skilled in the art, and its illustratin in a drawing and its description in the specification are accordingly omitted.

The Fifth Embodiment

Figure 11:
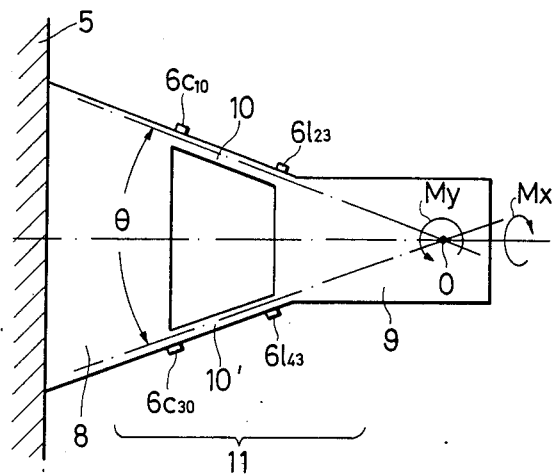
FIGS. 11(a) and 11(b) are front view and side view of a multi-axis load sensor according to a fifth embodiment of this invention.
Figure 11:
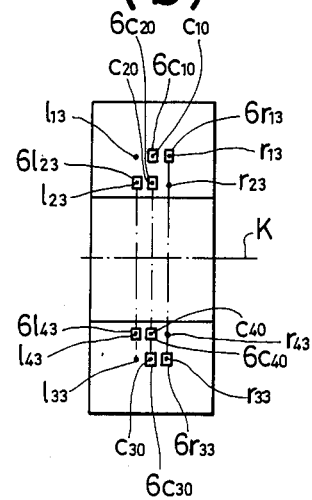

FIGS. 11(a) and 11(b) are front and side views of a multi-axis load sensor according to a fifth embodiment of this invention, in which like reference numerals and letters indicate like elements of art as shown in FIGS. 9(a) and 9(b). Description of such like elements is thus omitted. Reference letters $r_{13}, r_{23}, l_{13}, l_{23}$ indicate points on the top surface of the radial plate structure 11. These points are all located at portions where the thin-walled portion 10 and the fixed and movable portions 8,9 are connected together. Similarly, letters $r_{33}, r_{43}, l_{33}, l_{43}$ indicate points on the bottom surface of the radial plate structure 11. These positions are all located at portions where the thin-walled portion 3′ and the fixed and movable portions 8,9 are connected to each other. Different from the fourth embodiment, the positions $r_{13}, r_{23}, r_{33}, r_{43}, l_{13}, l_{23}, l_{33}, l_{43}$ are all located near a central part which is extremely close to the positions $c_{10}, c_{20}, c_{30}, c_{40}$. Designated at $6r_{13}, 6r_{33}, 6l_{23}, 6l_{43}$ are strain gauges provided respectively at the positions $r_{13}, r_{33}, l_{23}, l_{43}$.

When the moment $M_Y$ is applied about the standard axis (the Y-axis) in the radial plate structure 11, the thin-walled portions 10,10′ are deformed in a bending deformation mode. In this case, the absolute values of tensile and compression strains to which the respective strain gauges are subjected become substantially equal to one another for the same reasons mentioned above with respect to the fourth embodiment. When the force $F_Z$ is exerted along the perpendicular axis (the Z-axis) to the radial plate structure 11, the radial plate structure 11 shows substantial rigidity against the force $F_Z$. However, when the force $F_Z$ is applied with a greater magnitude, the thin-walled portions 10,10' undergo the same deformations as mentioned above. Therefore, tensile and compression strains, the absolute values of which are substantially equal to one another, are developed in the respective strain gauges for the same reasons mentioned above in connection with the fourth embodiment. When the moment $M_X$ is applied about the central axis to the radial plate structure 11, the radial plate structure 11 shows high rigidity against the moment $M_X$. When the moment $M_X$ is applied with a greater magnitude, the thin-walled portions 10,10' develop twisting deformations which are similar to the deformation illustrated in FIG. 2. Even by these deformations, no strains are produced in the strain gauges $c_{10}$–$c_{40}$ provided at the central part. Furthermore, the other strain gauges provided close to the above strain gauges develop only extremely small tensile or compression strains. For the same reasons as mentioned above in connection with the fourth embodiment, the absolute values of these tensile and compression strains are equal to one another.

The above-described strains of the respective strain gauges by the the moments $M_Y, M_X$ and force $F_Z$ will be summarized in the following table in the same way as in the first embodiment.

| Load | Gauge | | | | | | | |
|---|---|---|---|---|---|---|---|---|
| | $6c_{10}$ | $6c_{20}$ | $6c_{30}$ | $6c_{40}$ | $6r_{13}$ | $6r_{33}$ | $6l_{23}$ | $6l_{43}$ |
| $M_Y$ | + | − | − | + | + | − | − | + |
| $F_Z$ | + | + | − | − | + | − | + | − |
| $M_X$ | 0 | 0 | 0 | 0 | + | − | + | − |

Figure 12:
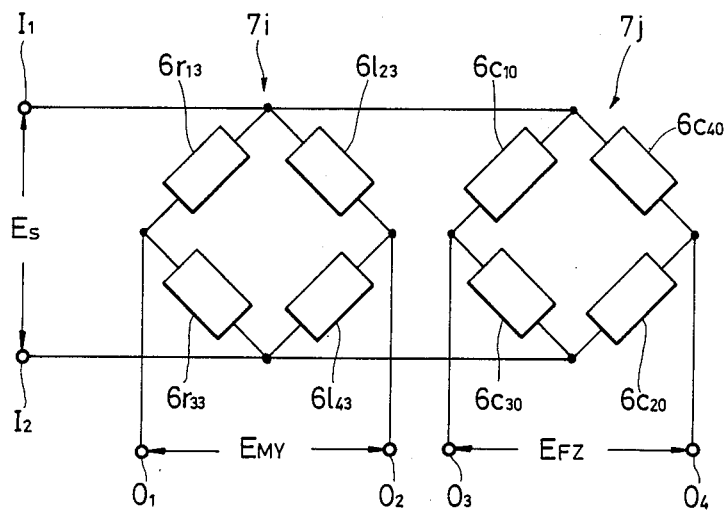
FIG. 12 is a circuit diagram of a detection circuit for the multi-axis load sensor depicted in each of FIGS. 11(a) and 11(b)

FIG. 12 is a circuit diagram of a detection circuit for the multi-axis load sensor depicted in FIGS. 11(a) and 11(b). There are illustrated a first bridge circuit 7i composed of the strain gauges $6r_{13}, 6r_{33}, 6l_{23}, 6l_{43}$ and a second bridge circuit 7j constructed of the strain gauges $6c_{10}, 6c_{20}, 6c_{30}, 6c_{40}$.

When the moment $M_Y$ is applied to the radial plate structure 11, tensile strains are developed in the strain gauges $6r_{13}, 6l_{43}$, while compression strains are produced in the strain gauges $6r_{33}, 6l_{23}$. Owing to the characteristics of the first bridge circuit 7i, a signal $E_{M_Y}$ corresponding to the moment $M_Y$ is output between the output terminals $O_1, O_2$. On the other hand, tensile strains are produced in the strain gauges $6c_{10}, 6c_{40}$, and compression strains are developed in the strain gauges $6c_{20}, 6c_{30}$. Owing to the characteristics of the second bridge circuit 7j, these strains are cancelled out, thereby making the output between the output terminals $O_3, O_4$ be 0.

When the force $F_Z$ is next applied with a greater magnitude to the radial plate structure 11, tensile and compression strains are developed respectively in the strain gauges $6c_{10}, 6c_{20}$ and the strain gauges $6c_{30}, 6c_{40}$ as shown in the above table. Owing to the characteristics of the second bridge circuit 7j, a signal $E_{F_Z}$ corresponding to the force $F_Z$ is output between its output terminals $O_3, O_4$. On the other hand, tensile strains are developed in the strain gauges $6r_{13}, 6l_{23}$, while compression strains are developed in the strain gauges $6r_{33}, 6l_{43}$. Owing to the characteristics of the first bridge circuit 7i, these strains are cancelled out, thereby making the output between the output terminals $O_3, O_4$ be 0.

When the moment $M_X$ is exerted with a greater magnitude to the radial plate structure 11, a twisting deformation similar to the deformation shown in FIG. 2 is developed. Since each strain gauge is arranged substantially in the central part as depicted in FIG. 11(b), strains by the twisting deformation are, however, so small that they may be ignored. In some instances, it may be impossible to use strain gauges having sizes significantly smaller compared with the widths of the thin-walled portions 10,10'. In this case, no strains are produced in the strain gauges $6c_1$–$6c_4$. However, tensile strains are developed in the strain gauges $6r_{13}, 6l_{23}$, while compression strains are developed in the strain gauges $6r_{33}, 6l_{43}$. These strains are, however, cancelled out owing to the characteristics of the first bridge circuit 7i, thereby making the output between the output terminals $O_1, O_2$ be 0.

Consequently, the radial plate structure 11 shows high rigidity against the forces $F_X, F_Y$ and the moment $M_Z$, and the output of the detection circuit becomes 0 for the moment $M_X$. Accordingly, the multi-axis load sensor of this embodiment serves as a 2-axis load sensor capable of detecting moment $M_Y$ applied about the standard axis and forces $F_Z$ exerted in the direction of the perpendicular axis.

When the crossing angle $\theta$ is an obtuse angle in the present embodiment, the same discussion can also be applied as that mentioned in connection with the fourth embodiment, and the force $F_X$ is detected in place of the force $F_Z$. When the crossing angle $\theta$ is 90 degree, the above discussion on the fourth embodiment can also be applied, including the possibility of making up a 3-axis load sensor.

By the way, the arrangement of the strain gauges is not necessarily limited to the arrangement shown in FIG. 11(b). The same results can be brought about even when the strain gauges are provided at the points $l_{13}, l_{33}, r_{23}, r_{43}$ instead of the points $r_{13}, r_{33}, l_{23}, l_{43}$, and the first bridge circuit 7i is made up with these strain gauges. Furthermore, in the case of a radial plate structure of the symmetrical shape, it is apparently possible to provide, on a radial plate structure located at a position symmetrical with the radial plate structure 11 shown in FIGS. 11(a) and 11(b), at the symmetrical points with those of the latter radial plate structure.

In the present embodiment, the plurality of strain gauges are provided at the predetermined points on the radial plate structure, the plural sets of suitable bridge circuits are formed with these strain gauges, and deformations by forces along the perpendicular axis (or along the central axis)—which deformations have conventionally been excluded from consideration—are positively detected. It is therefore possible to detect both moments exerted about the standard axis and forces exerted along the perpendicular axis (or along the central axis) separately. In the special case (i.e., when the crossing angle is 90 degree), it can detect moments applied about the standard axis and forces applied along the perpendicular and central axes.

The above-described first to fifth embodiments are all embodiments on the basic plate structure. By combining such basic plate structures, it is possible to construct a multi-axis load sensor which can detect more load components. Description will hereinafter be made of a multi-axis load sensor of such a combined structure.

The Sixth Embodiment

Figure 13:
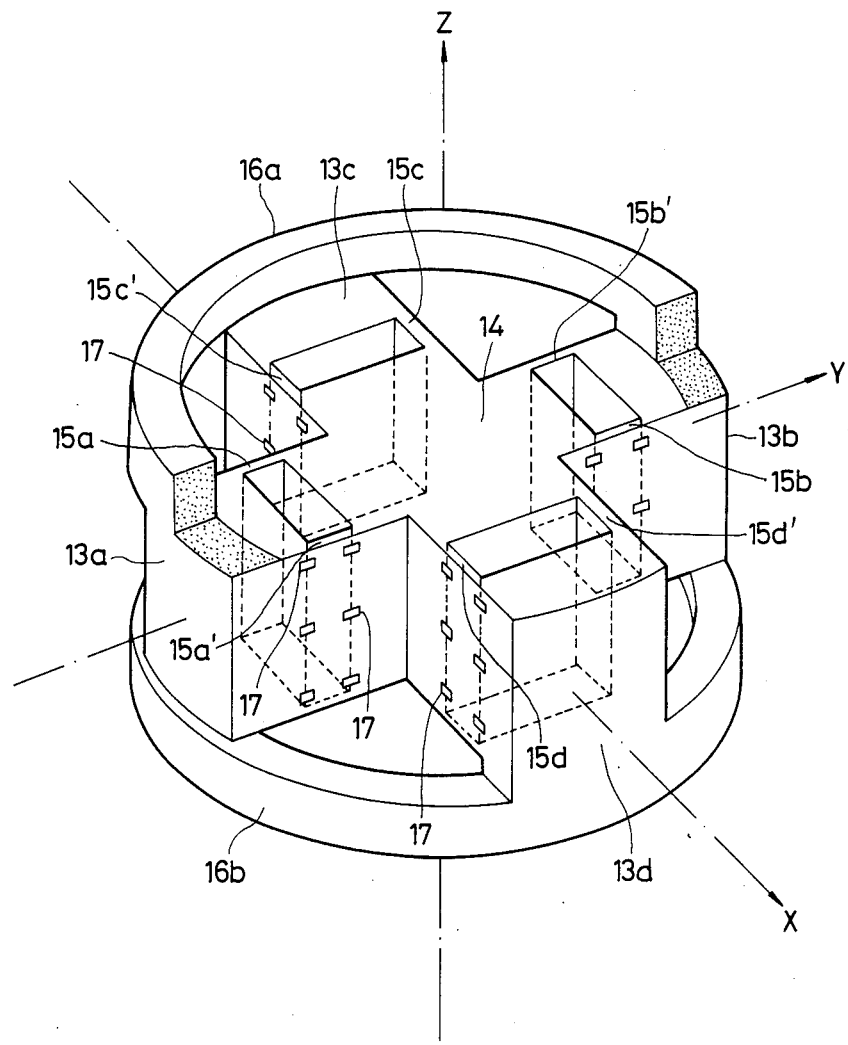
FIGS. 13, 14, 15 and 16 are respectively perspective views of multi-axis load sensors according to a sixth, a seventh, an eighth, and a ninth embodiment of this invention.

FIG. 13 is a perspective view of a multi-axis load sensor according to a sixth embodiment of this invention. In the figure, there are shown peripheral rigid portions 13a,13b,13c,13d of which the peripheral rigid portions 13a,13b are in a mutually-opposing positional relation, while the rigid portions 13c,13d are also in a mutually-opposing positional relation. Numeral 14 indicates a central rigid portion, whereas numeral 15a,15a' indicate mutually-parallel thin-walled portions connecting the central rigid portion 14 and the peripheral rigid portion 13a. Similarly, numerals 15b,15b',15c,15c',15d,15d' are mutually-parallel thin-walled portions which connect the central rigid portion 14 and the peripheral rigid portions 13b,13c, 13d respectively. As is apparent from the drawing, these peripheral rigid portions 13a–13d, central rigid portion 14 and thin-walled portions 15a–15d' are put together in such a way that two parallel plate structures of a symmetrical shape are combined so as to allow them to cross at a right angle at the central rigid portion 14. Designated at numeral 16a is an upper ring-shaped member having high rigidity and connected to the peripheral rigid portions 13a,13b together, whereas designated at numeral 16b is a lower ring-shaped member having high rigidity and connected to the peripheral rigid portions 13c,13d. These portions and members are all constructed as a unitary member. Numeral 17 indicates plural sets of strain gauges provided at end parts of predetermined thin-walled portions. When detecting a load, target members are so connected respectively to each one of the upper ring-shaped member 16a and the lower ring-shaped member 16b that all the load to be detected should pass through the load sensor.

Operation of the above multi-axis load sensor will next be described. The description of the operation of the present embodiment will, however, be limited to its outline, because the detection operation of the parallel plate structure has already been described in detail in connection with the first and second embodiments. Here, let's set up coordinate axes as shown in the drawing. Let's now suppose that the force $F_X$ is applied to the upper ring-shaped member 16a in the direction of the X-axis. This force $F_X$ is then transmitted to the peripheral rigid portions 13a,13b. In this case, the central rigid portion 14 becomes equivalent to the fixed portion of the basic parallel plate structure. By the force $F_X$, bending deformations are thus developed in the thin-walled portions 15a,15a',15b,15b'. Then, these deformations develop strains in the strain gauges provided on the thin-walled portions. As a result, the force $F_X$ is detected by the bridge circuits composed of these strain gauges.

When the force $F_Y$ is exerted to the upper ring-shaped member 16a in the direction of the Y-axis, this force $F_Y$ is transmitted from the peripheral rigid portions 13a,13b to the central rigid portion 14. In this case, the peripheral rigid portions 13c,13d become equivalent to the fixed portion, and bending deformations are produced in the thin-walled portions 15c,15c',15d,15d'. The force $F_Y$ is hence detected by the bridge circuit which is made up of the strain gauges provided on these thin-walled portions.

When the moment $M_X$ is applied at the upper ring-shaped member 16a about the X-axis, this moment $M_X$ is transmitted from the peripheral rigid bodies 13a,13b to the central rigid portion 14. In this case, the peripheral rigid portions 13c,13d become equivalent to the fixed portion, and twisting deformations are hence developed in the thin-walled portions 15c,15c', 15d,15d'. By the bridge circuit composed of the strain gauges which are provided on these thin-walled portions, the moment $M_X$ is detected.

When the moment $M_Y$ is applied at the upper ring-shaped member 16a about the Y-axis, this moment $M_Y$ is transmitted to the peripheral rigid portions 13a,13b. In this case, the central rigid portion 14 becomes equivalent to the fixed portion, and twisting deformations are produced in the thin-walled portions 15a,15a',15b,15b'. Therefore, the moment $M_Y$ is detected by the bridge circuit which is made up of the strain gauges provided on the thin-walled portions.

By the way, it is not absolutely necessary to form the upper and lower ring-shaped members integrally with the peripheral rigid portions. It may be feasible to connect separately-formed upper and lower ring-shaped members and peripheral rigid portions by means of suitable rigid means. If utilization is also made on "the deformation, which contains the elongation/compression deformation mode" depicted in FIG. 4, of each thin-walled portion by the moment $M_Z$ about the Z-axis, the moment $M_Z$ can also be detected in addition to the above-described forces $F_X,F_Y$ and moment $M_X,M_Y$.

In the present embodiment, the multi-axis load sensor has the structure composed by combining at a right angle two parallel plate structures of the symmetrical shape, the plurality of strain gauges are provided at the predetermined points on each of the thin-walled portions, and the plural sets of bridge circuits are made up with these strain gauges. Thus, four load components (or 5 load components if the moment $M_Z$ is added) can be detected accurately with a simple structure. Besides, its machining is easy upon its fabrication. Furthermore, it contains rather fewer deformable portions compared with the number of detectable load components. It is thus possible to obtain a sensor having high rigidity as the overall structure. It is also feasible to achieve well-balanced designing which conforms with various requirements or specifications. When this sensor is applied to a robot, it is possible to bring about the same advantageous effects as the first embodiment.

The Seventh Embodiment

Figure 14:
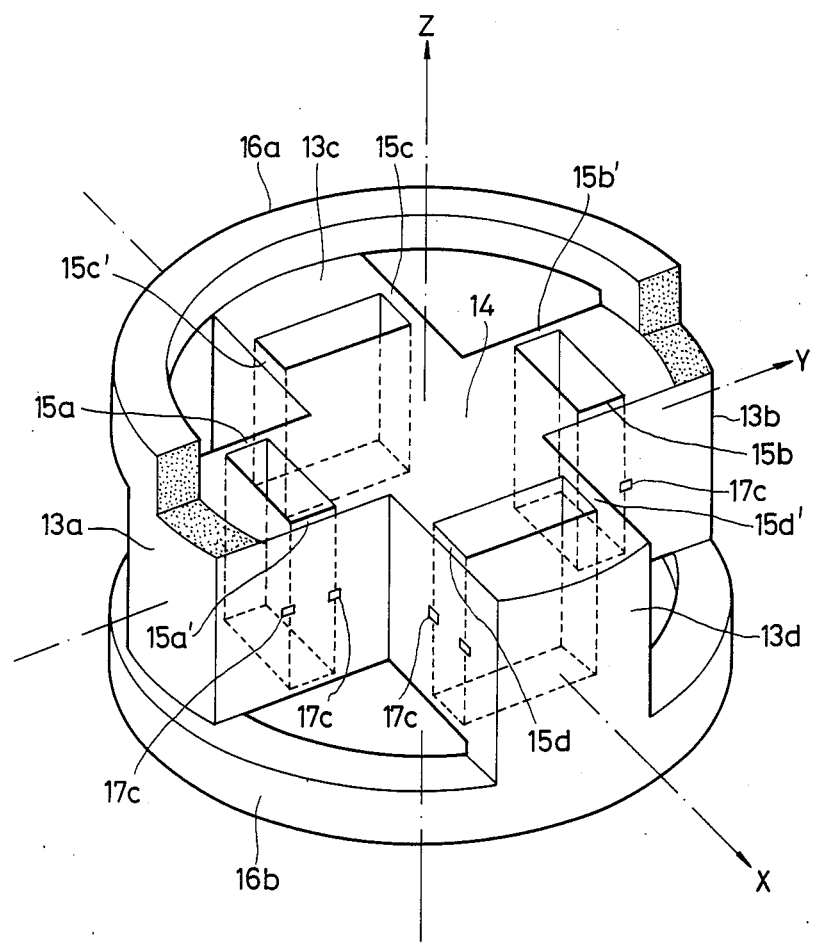

FIG. 14 is a perspective view of a multi-axis load sensor according to a seventh embodiment of this invention. In the figure, like reference numerals and letters identify like elements of structure in FIG. 13. Description of such like elements is thus omitted here. Numeral 17c indicates strain gauges provided at central end parts of predetermined thin-walled portions. This embodiment is different from the sixth embodiment only in that the strain gauges are provided at the central parts of the thin-walled portions and on the both sides of the central parts in the sixth embodiment, while the strain gauges are provided only at the central parts in the present embodiment. In the same manner as the sixth embodiment, the structure of this embodiment can detect forces $F_X$ in the direction of the X-axis and forces $F_Y$ in the direction of the Y-axis. In addition, this embodiment also permits the detection of moments $M_Z$ when they are applied about the Z-axis. Namely, "the deformations which contain elongation/compression deformation mode" illustrated in FIG. 4 are produced in the thin-walled portions 15a–15d' when the moment $M_Z$ is applied. Reflecting these deformations, each strain gauge 17c develops a strain. By making up bridge circuits with the respective strain gauges 17c as shown in FIG. 7, it is also possible to detect the moment $M_Z$ besides the above-described $F_X, F_Y$.

In the present embodiment, the multi-axis load sensor has the structure composed by combining at a right angle two parallel plate structures of the symmetrical shape, the strain gauges are provided only at the central end parts of each thin-walled portion, and the prescribed bridge circuits are made up with these strain gauges. Thus, three load components can be detected with a simple structure. Other advantageous effects are the same as those brought about by the sixth embodiment.

The Eighth Embodiment

Figure 15:
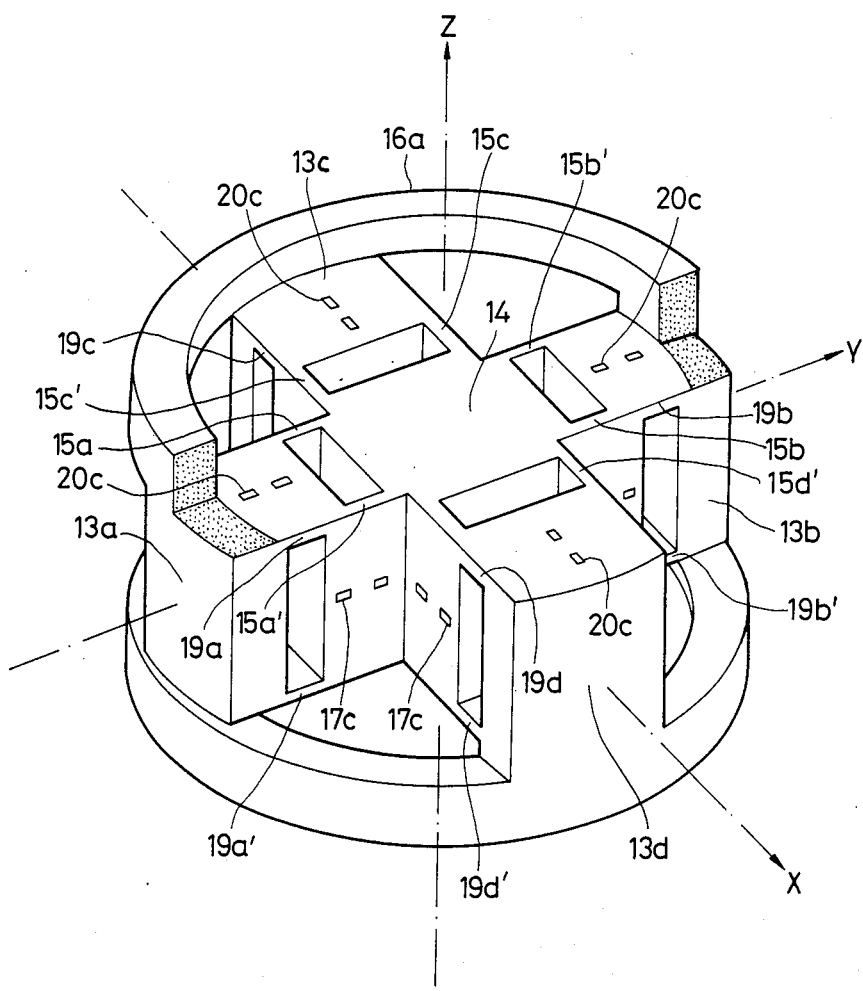

FIG. 15 is a perspective view of a multi-axis load sensor according to an eighth embodiment of this invention. In the drawing, like reference numerals and letters identify like elements of structure in FIG. 14. Description of such like elements is hence omitted here. Numerals 19a and 19a' indicate thin-walled portions which connect the central rigid portion 14 and the peripheral rigid portion 13a. These thin-walled portions 19a, 19a' have their thicknesses in the direction of the Z-axis, although the thin-walled portions 15a, 15a' have their thicknesses in the direction of the X-axis. Similarly, designated at numerals 19b and 19b' are thin-walled portions which connect the central rigid portion 14 and the peripheral rigid portion 13b together. These thin-walled portions 19b, 19b' have their thicknesses in the direction of the Z-axis, although the thin-walled portions 15b, 15b' have their thicknesses in the direction of the X-axis. Reference numerals 19c and 19c' indicate thin-walled portions which connect the central rigid portion 14 and the peripheral rigid portion 13c to each other. Although the thin-walled portions 15c, 15c' have their thicknesses in the direction of the Y-axis, the thin-walled portions 19c, 19c' have their thicknesses in the direction of the Z-axis. Designated at numerals 19d and 19d' are thin-walled portions which connect the central rigid portion 14 and the peripheral rigid portion 13d together. The thin-walled portions 19d, 19d' have thicknesses in the direction of the Z-axis, although the thin-walled portions 15c, 15c' have their thicknesses in the direction of the Y-axis. Namely, the thin-walled portions 15a–15d' and thin-walled portions 19a–19d' have been formed by boring two through-holes in mutually perpendicular directions though each of the rigid portions between the central rigid portion 14 and the respective peripheral rigid portions 13a–13d. Numeral 20c indicates strain gauges provided at central end parts of the respective thin-walled portions 19a–19d'. As is apparent from the drawing, the present embodiment has a structure obtained by combining, with the two sets of parallel plate structures depicted in FIG. 14, two additional sets of parallel plate structures of the same type as the former plate structures in such a way that the standard axes of the former parallel plate structures cross at right angles with the corresponding standard axes of the latter parallel plate structures.

Since the structure of this embodiment contains the same structure as that depicted in FIG. 14 as mentioned above, it is immediately and firstly understood that it can detect the forces $F_X, F_Y$ and the moment $M_Z$. The structure of this embodiment can also detect three other components ($F_Z, M_X, M_Y$) in addition to the above-mentioned three components. Namely, the force $F_Z$ in the direction of the Z-axis can be detected on the basis of bending deformations which are developed in the thin-walled portions 19a, 19a', 19b, 19b'. The moment $M_X$ about the X-axis can be detected on the basis of deformations of the thin-walled portions 19a, 19a', 19b, 19b', each of which is "the deformations which contain the elongation/compression deformation mode" depicted in FIG. 4. On the other hand, the moment $M_Y$ about the Y-axis can also be detected by deformations of the thin-walled portions 19c, 19c', 19d, 19d', which deformations contain elongation/compression deformation mode respectively.

In the present embodiment, two sets of parallel plate structures are combined with an additional two sets of parallel plate structures of the same type as the former parallel plate structures with the standard axes of the former parallel plate structures crossing at right angles with the corresponding standard axes of the latter parallel plate structures, the strain gauges are provided at the central end parts of each thin-walled portion, and the prescribed bridge circuits are made up with these strain gauges. Thus, six load components can be detected with a simple structure. Other advantageous effects are the same as those brought about by the sixth embodiment.

The Ninth Embodiment

Figure 16:
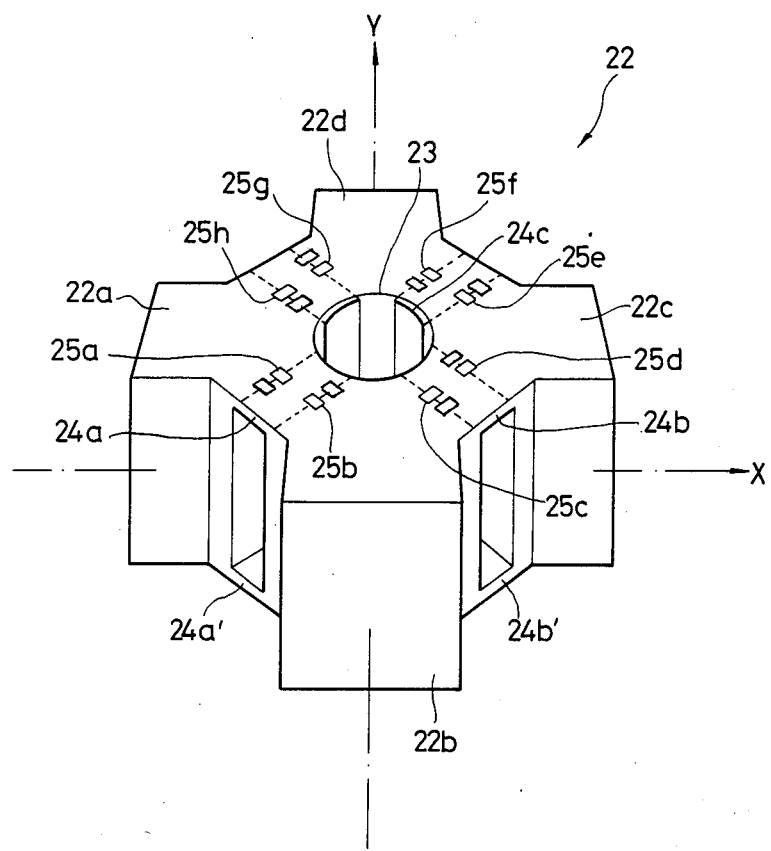

FIG. 16 is a perspective view of a multi-axis load sensor according to a ninth embodiment of this invention. In the drawing, there are illustrated a block 22, outwardly-extending portions 22a, 22c which extend out in the direction of the X-axis in the block 22, and outwardly-extending portions 22b, 22d which extend out in the direction of the Y-axis in the block 22. Numeral 23 indicates a through-hole bored in the direction of the Z-axis through a central part of the block 22. Designated at numerals 24a, 24a' are thin-walled portions which connect the mutually-adjacent outwardly-extending portions 22a, 22b together. These thin-walled portions 24a, 24a' are provided in parallel to each other. These thin-walled portions 24a, 24a' have been formed by boring a rectangular hole from the outer side wall of the block 22 to the through-hole 23 at an angle of 45 degree relative to the X-axis and Y-axis. They thus make up a parallel plate structure. Numerals 24b, 24b', 24c, 24c', 24d and 24d' indicate thin-walled portions formed by their corresponding rectangular holes, which are the same as that described above, respectively between the outwardly-extending portions 22b and 22c, between the outwardly-extending portions 22c and 22d and between the outwardly-extending portions 22d and 22a. These thin-walled portions make up parallel plate structures. Numerals 25a–25h indicate stain gauges provided at central end parts of the respective thin-walled portions 24a, 24b, 24c, 24d, while numerals 25a'–25h' (all of which are on the bottom surface of the block 22 and are not shown in the drawing) indicate strain gauges provided at central end parts of the respective thin-walled portions 24a', 24b', 24c', 24d'. The strain gauges 25a and 25a', the strain gauges 25b and 25b', . . . , and the strain gauges 25h and 25h' are respectively in symmetrical positional relations relative to the X-Y plane. When this block 22 (cruciform parallel plate structure) is used as a multi-axis load sensor, a rigid member (not illustrated) is connected with high rigidity to the outwardly-extending portions 22a, 22c while another rigid member (not illustrated) is connected with high rigidity to the outwardly-extending portions 22b,22d. Therefore, the outwardly-extending portions 22a and 22c are mutually restrained by the former rigid members, and the outwardly-extending portions 22b and 22d are mutually restrained by the latter rigid member.

Figure 17:
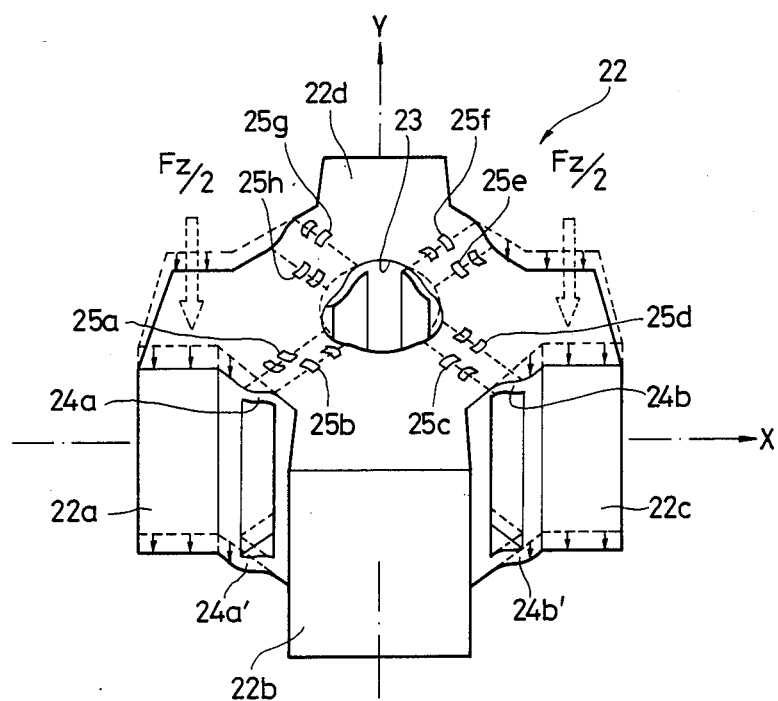
FIGS. 17(a) and 17(b) are perspective views showing the multi-axis load sensor depicted in FIG. 16 when loads have been applied thereto.
Figure 17:
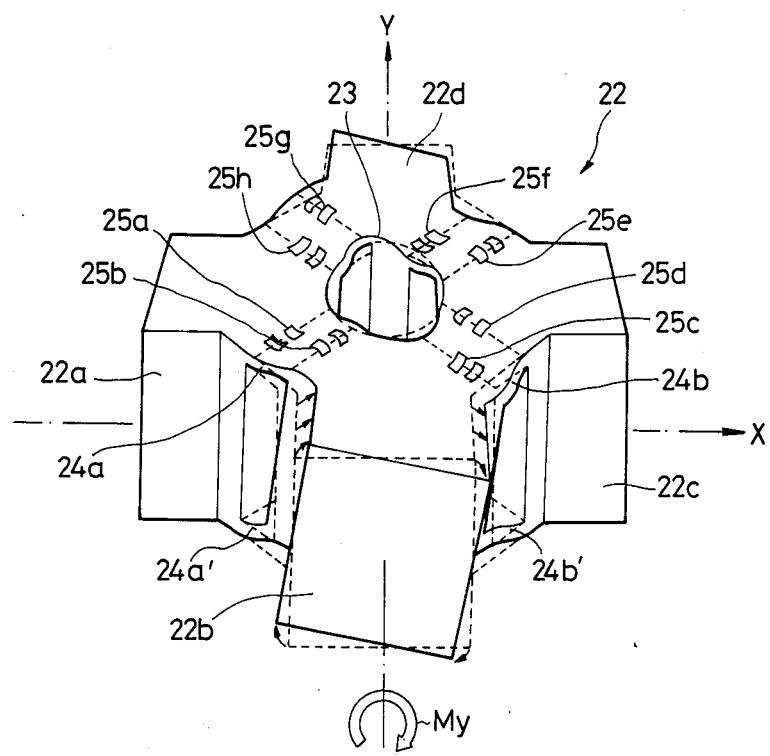

FIGS. 17(a) and 17(b) are respectively perspective views when loads are applied to the cruciform parallel plate structure depicted in FIG. 16. Namely, FIG. 17(a) illustrates a deformation mode of the cruciform parallel plate structure, which is shown in FIG. 16, when the force $F_Z$ is exerted in the direction of the Z-axis. The force $F_Z$ is applied to the outwardly-extending portions 22a,22c with the equal half magnitude ($F_Z/2$), thereby causing the cruciform parallel plate structure to undergo a deformation as illustrated in the drawing. Reflecting this deformation, strains are developed in the respective strain gauges 25a–25h'. On the other hand, FIG. 17(b) illustrates a deformation mode of the cruciform parallel plate structure of FIG. 16 when the moment $M_Y$ is applied thereto about the Y-axis. Reflecting this deformation, strains are developed in the respective strain gauges 25a–25h'. The cruciform parallel plate structure also undergoes a deformation equivalent to that shown in FIG. 17(b) when the moment $M_X$ is applied about the X-axis. Reflecting this deformation, strains are developed in the strain gauges 25a–25h'.

The above-described strains of the respective strain gauges by the force $F_Z$ and moments $M_Y,M_X$ will be summarized in the following table in the same way as in the first embodiment. In the following table, the "top surface" means the top surface of the block 22, while the "bottom surface" means the bottom surface of the block 22. Taking the strain gauges 25a,25a' as examples, the top surface indicates the strain gauge 25a, and the bottom surface indicates the strain gauge 25a'.

| Load | Position | Gauge | | | | | | | |
|---|---|---|---|---|---|---|---|---|---|
| | | 25a 25a' | 25b 25b' | 25c 25c' | 25d 25d' | 25e 25e' | 25f 25f' | 25g 25g' | 25h 25h' |
| $F_Z$ | Top surface | − | + | + | − | − | + | + | − |
| | Bottom surface | + | − | − | + | + | − | − | + |
| $M_X$ | Top surface | − | + | + | − | + | − | − | + |
| | Bottom surface | + | − | − | + | − | + | + | − |
| $M_Y$ | Top surface | − | + | − | + | + | − | + | − |
| | Bottom surface | + | − | + | − | − | + | − | + |

Figure 18:
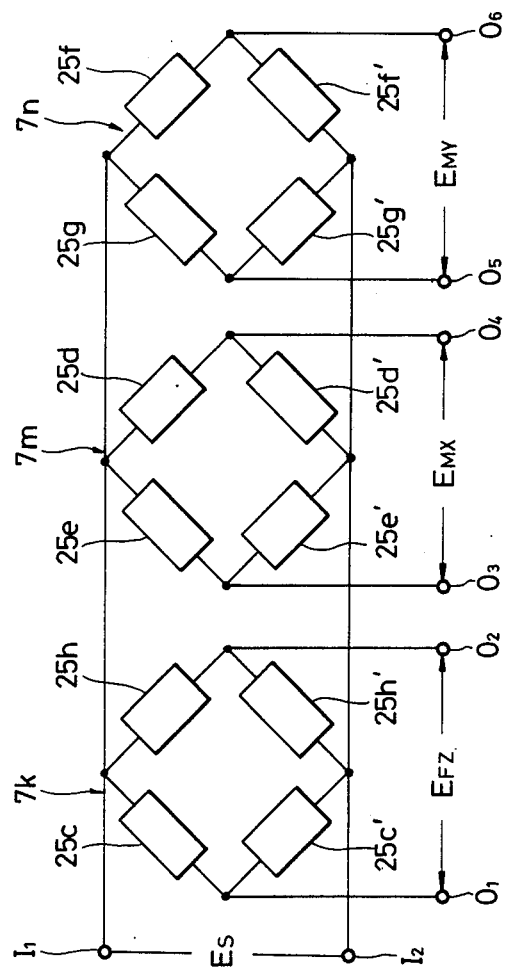
FIG. 18 is a circuit diagram of a detection circuit for the multi-axis load sensor depicted in FIG. 16.

FIG. 18 shows a circuit diagram of a detection circuit for the multi-axis load sensor depicted in FIG. 16. In the drawing, there are illustrated a first bridge circuit 7k composed of the strain gauges 25c,25c',25h,25h', a second bridge circuit 7m composed of the strain gauges 25e,25e',25d,25d', and a third bridge circuit 7n composed of the strain gauges 25g, 25g',25f,25f'. In this embodiment, the strain gauges 25a,25a',25b,25b'are not utilized.

When the force $F_Z$ is applied to the multi-axis load sensor of this embodiment in the direction of the Z-axis, the multi-axis load sensor is deformed as shown in FIG. 17(a), and strains such as are indicated in the row $F_Z$ of the above table are developed in the respective strain gauges 25a–25h'. Namely, in the first bridge circuit 7k, tensile strains are produced in the strain gauges 25c,25h' while compression strains are developed in the strain gauges 25c',25h. Under these strains, a signal $E_{FZ}$ corresponding to the force $F_Z$ is output between the output terminals $O_1, O_2$ owing to the characteristics of the first bridge circuit 7k. On the other hand, in the second bridge circuit 7m, tensile strains are produced in the strain gauges 25e',25d' while compression strains are developed in the strain gauges 25e,25d. Owing to the characteristics of the second bridge circuit 7m, the strains from the respective strain gauges are cancelled out, thereby making the output between its output terminals $O_3,O_4$ be 0. Furthermore, in the third bridge circuit 7n, tensile strains are produced in the strain gauges 25g,25f while compression strains are developed in the strain gauges 25g',25f'. Owing to the characteristics of the third bridge circuit 7n, the strains of the respective strain gauges are cancelled out, and the output between its output terminals $O_5, O_6$ becomes 0.

When the moment $M_Y$ is applied about the Y-axis to the multi-axis load sensor of this embodiment, the multi-axis load sensor is deformed as illustrated in FIG. 17(b). Hence, strains such as are indicated in the row $M_Y$ of the above table are produced respectively in the strain gauges 25a–25h'. Owing to the characteristics of the respective bridge circuits 7k,7m,7n, the strains, produced upon application of the moment $M_Y$, of the respective strain gauges are cancelled out to output 0 between their respective output terminals in the first and second bridge circuits 7k,7m, but a signal $E_{MY}$ corresponding to moment $M_Y$ is output between the output terminals $O_5,O_6$ of the third bridge circuit 7n. Similarly, when the moment $M_X$ is applied about the X-axis, the outputs of the first and third bridge circuits 7k,7n become 0, but a signal $E_{MX}$ corresponding to the moment $M_X$ is output between the output terminals $O_3,O_4$ of the second bridge circuit 7m.

Consequently, the multi-axis load sensor shown in FIG. 16 makes up a 3-axis load sensor which can detect forces $F_Z$ applied in the direction of the Z-axis, moments $M_Y$ exerted about the Y-axis and moments $M_X$ applied about the X-axis.

By the way, the structures of the bridge circuits are not necessarily limited to the above exemplified ones. It is possible to selectively combine the strain gauges in various ways. In place of the combination of the strain gauges in the above respective bridge circuits (25c,25c',25h,25h'), (25e, 25e',25d,25d'), and (25g,25g',25f,25f'), it may for example be possible to choose the combination (25g, 25g',25d,25d'), (25h,25h',25a,25a') and (25b,25b',25c, 25c') for the detection of the force $F_Z$ and the moment $M_X,M_Y$.

In the present embodiment, the strain gauges are provided at the central end parts of the respective thin-walled portions of the cruciform parallel plate structure, and the plural sets of prescribed bridge circuits are composed with the strain gauges as mentioned above. Therefore, three load components can be detected with a simple structure. Other advantageous effects are the same as those brought about by the sixth embodiment.

The Tenth Embodiment

Figure 19:
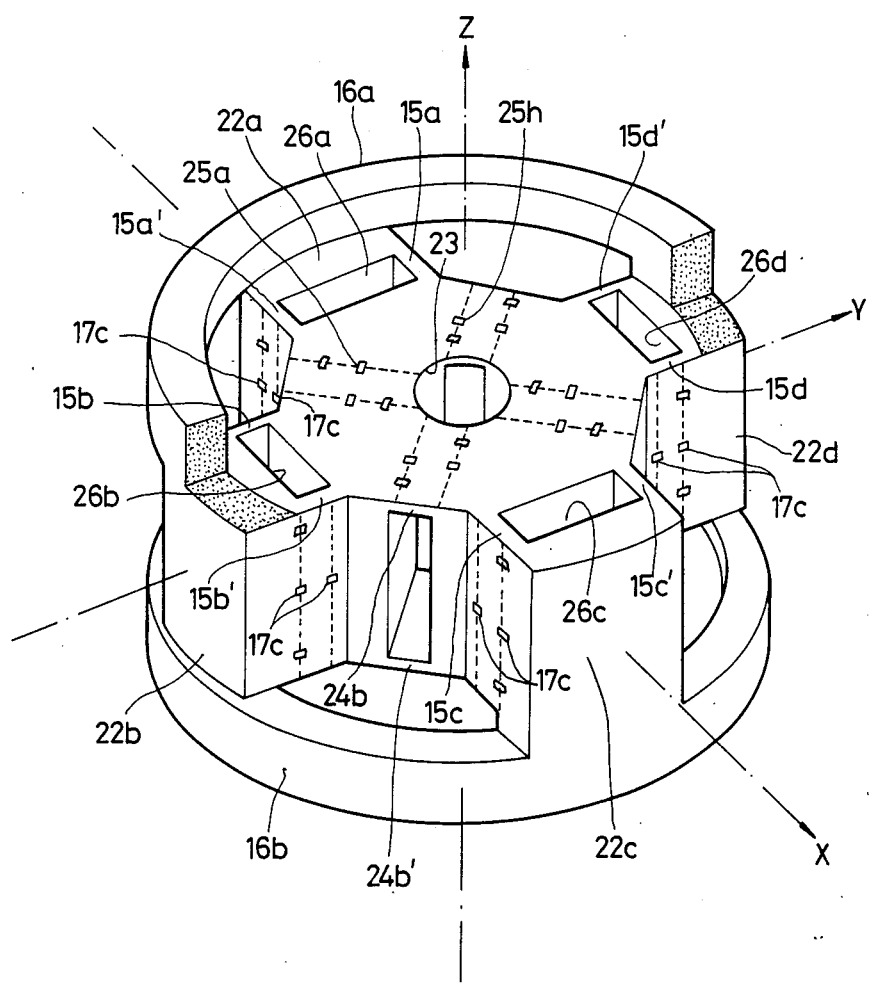
FIGS. 19 and 20 are respectively perspective views of multi-axis load sensors according to a tenth and an eleventh embodiment of this invention.

FIG. 19 is a perspective view of a multi-axis load sensor according to a tenth embodiment of this invention. The multi-axis load sensor of this embodiment has been constructed by combining the cruciform parallel plate structure of the ninth embodiment with the parallel plate structure of the seventh embodiment. Namely, parallel plate structures are defined by rectangular through-holes extending respectively along the Z-axis through the outwardly-extending portions 22a,22b,22c,22d of the cruciform parallel plate structure of the ninth embodiment, and the upper and lower ring-shaped members 16a,16b are also provided. In order to facilitate the understanding of the multi-axis load sensor of this embodiment, those elements corresponding to the elements of structures in the seventh and ninth embodiments are identified by the same reference numerals and letters in FIG. 19.

Similar to the ninth embodiment, in the present embodiment, the outwardly-extending portions 22a,22b, 22c,22d are formed in the block 22, the through-hole 23 is bored through the central part of the block 22, and the thin-walled portions 24a,24a', . . . , 24d,24d' are formed between the respective adjacent outwardly-extending portions. The strain gauges 25a–25h' are provided at the central end parts on both the upper and the lower surfaces of the respective thin-walled portions. Designated at numerals 26a, 26b, 26c and 26d are through-holes bored along the Z-axis through the respective outwardly-extending portions 22a,22b,22c, 22d. By these through-holes 26a–26d, the thin-walled portions 15a,15a', . . . ,15d,15d' described in connection with the seventh embodiment are defined. The strain gauges 17c are provided at central end parts of these thin-walled portions. The upper parts of the mutually-confronting outwardly-extending portions 22b,22d are connected together by the upper ring-shaped member 16a described in connection with the seventh embodiment. The lower parts of the other mutually-confronting outwardly-extending portions 22a,22c are connected by the lower ring-shaped member 16b.

The operation of this embodiment is the same as those of the seventh and ninth embodiments. Namely, by making up suitable bridge circuits with the respective strain gauges, the force $F_Z$ and the moments $M_X,M_Y$ are detected at the cruciform parallel plate structure. On the other hand, the forces $F_X,F_Y$ and the moment $M_Z$ are detected by the parallel plate structures formed respectively in the outwardly-extending portions. Therefore, the multi-axis load sensor of this embodiment makes up a 6-axis load sensor which can detect forces $F_X,F_Y,F_Z$ and moments $M_X,M_Y,M_Z$.

The multi-axis load sensor of this embodiment has thus been constructed by combining the cruciform parallel plate structure of the ninth embodiment with the parallel plate structure of the seventh embodiment. The plural sets of prescribed bridge circuits have been composed with the respective strain gauges. It is therefore possible to detect 6 load components with a simple structure. Other advantageous effects are the same as those of the sixth embodiment.

The Eleventh Embodiment

Figure 20:
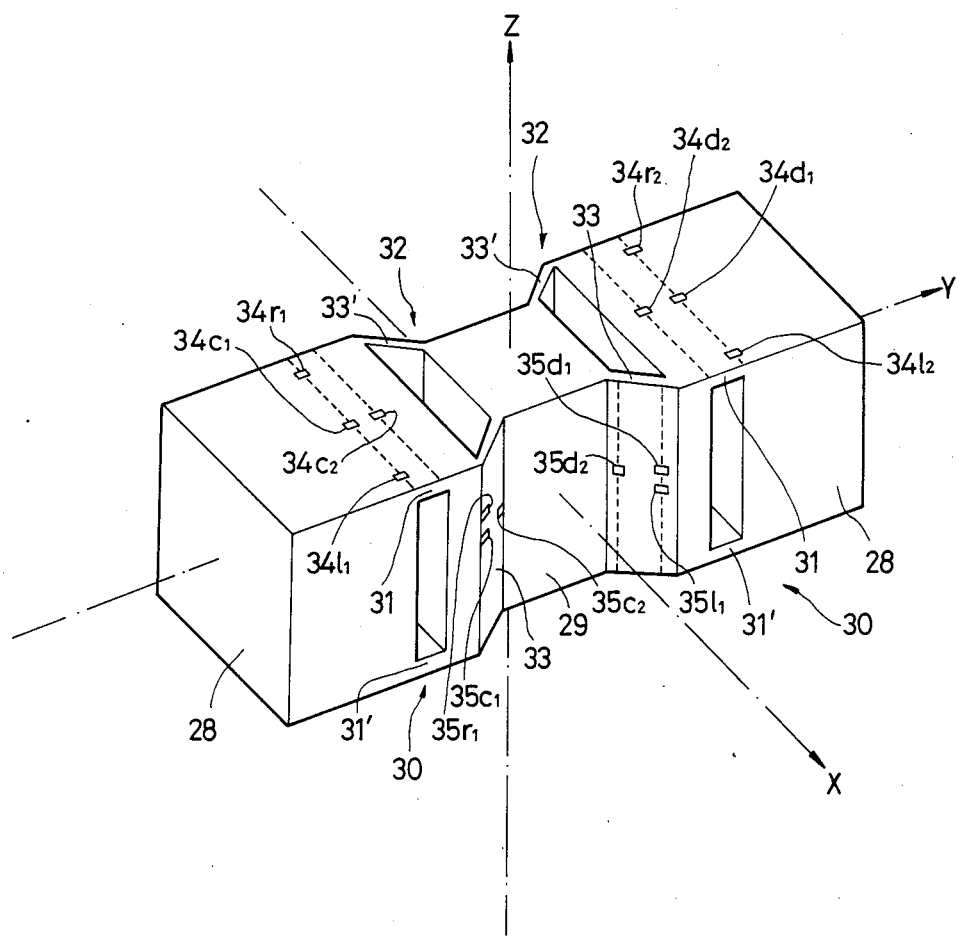
Figure 21:
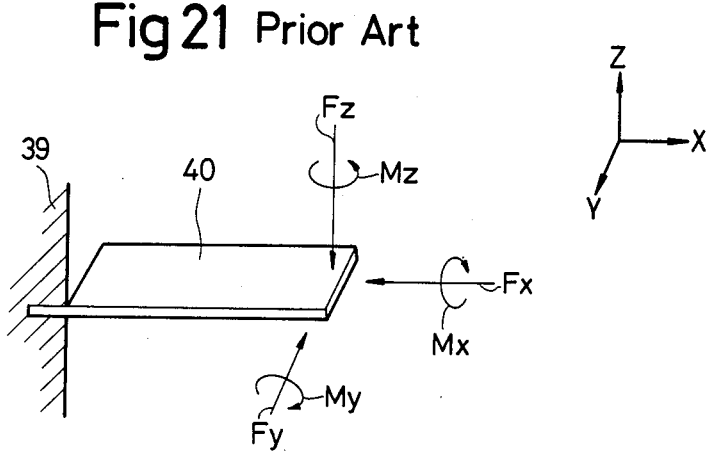
FIG. 21 is a perspective view of a planar flexible beam.

FIG. 20 is a perspective view of a multi-axis load sensor according to an eleventh embodiment of this invention. The multi-axis load sensor of this embodiment has been constructed by combining a symmetrical parallel plate structure, which is a symmetrical version of the first embodiment, with a symmetrical radial plate structure, which is a symmetrical version of the fifth embodiment, in such a way that their central axes coincided. In the drawing, numeral 28 indicates a fixed portion, while numeral 29 indicates a movable portion. Designated at numeral 30 is a parallel plate structure formed between the fixed portion 28 and the movable portion 29. Numerals 31 and 31' indicate respectively thin-walled portions which are parallel to each other and make up the parallel plate structure 30. There are also illustrated a radial plate structure 32 formed between the fixed portion 28 and the movable portions 29, and radially-extending thin-walled portions 33,33' forming the radial plate structure 32. The arrangement of the respective strain gauges is similar to those in the first and fifth embodiments. The multi-axis load sensor of this embodiment has a structure formed by combining the symmetrical version of the first embodiment and the symmetrical version of the fifth embodiment. It is therefore clear that it makes up a 6-axis load sensor, in which the force $F_Z$ and moments $M_X,M_Y$ can be detected by the parallel plate structure 30, while the moment $M_Z$ and forces $F_X,F_Y$ can be detected by the radial plate structure 32.

In the present embodiment, the symmetrical parallel plate structure and the symmetrical radial plate structure are combined with their central axes coincided, and the plural sets of prescribed bridge circuits are composed with the respective strain gauges. It is therefore possible to detect 6 load components with a simple structure. Compared with its rigidity against the force $F_Z$ and the moment $M_Z$, it has higher rigidity against the other load components. It is hence extremely effective when there is a need for providing a large difference or differences among the rigidity levels against respective load components to be detected—for example, when precisely measuring the torque and thrust of a drill. Other advantageous effects are the same as those of the sixth embodiment.

Caveat

Some embodiments of this invention have been described above. It should, however, be borne in mind that the present invention is not necessarily limited to the above embodiments. Various other multi-axis load sensors can be constructed by combining suitably the basic plate structures, which have been described above in connection with the first to fifth embodiments.

In the above embodiments, the flexible beams (thin-walled portions) have all been described as plates. Needless to say, these flexible beams may be formed into flexible beams having non-uniform thicknesses as mentioned above.

Furthermore, the rigidity of these flexible beams against bending deformations or twisting deformations vary independently in accordance with the thicknesses, lengths and/or widths of the flexible beams, the distances between the respective thin-walled portions, differences in changes of their cross-sections, etc. Hence, it is possible to suitably design or adjust the rigidity of each flexible beam against bending deformations and twisting deformations by making positive use of the above-mentioned various features in accordance with each required rated value.

Furthermore, the above embodiments have been described using, as exemplary detection means, strain gauges which are most popular. Such detection means are not necessarily limited to strain gauges, and magneto-elastic devices, differential transformers, electro-capacitive displacement detection elements, and eddy-current displacement detection elements may also be employed.

Having now fully described the invention, it will be apparent to one of ordinary skill in the art that many changes and modifications can be made thereto without departing from the spirit or scope of the invention as set forth herein.

We claim:

1. A multi-axis load sensor comprising a two rigid members and at least one parallel plate structure connecting said two rigid members to each other, said at least one parallel plate structure being composed of a plurality of thin-walled plates arranged in parallel to one another and adapted to detect forces and moments, said at least one parallel plate structure being equipped with:
   (a) first detection means for detecting deformations of said thin-walled plates, said deformations being of the bending deformation mode and beign developed by force components applied along the standard axis of said parallel plate structure, and
   (b) second detection means for detecting deformations of the twisting deformation mode developed by moment components applied about the central axis of said parallel plate structure.

2. A multi-axis load sensor according to claim 1, wherein said parallel plate structure is composed as a unitary member by combining substantially at a right angle two symmetrical parallel plate structures each of which is composed of two parallel plate structure arranged so that their perpendicular axes coincide.

3. A multi-axis load sensor according to claim 1, wherein said parallel plate structure is composed as a unitary member by combining:
   (a) a first symmetrical parallel plate structure complex, which is composed of two symmetrical parallel plate constructions with the central axes thereof being coincident with each other and the standard axes thereof extending substantially at a right angle relative to each other, with
   (b) a second symmetrical parallel plate structure complex having the same structure as the first symmetrical parallel plate structure complex and having a central axis extending substantially at a right angle relative to the central axis of the first symmetrical parallel plate structure complex.

4. A multi-axis load sensor according to claim 1, wherein said parallel plate structure is defined by a through-hole extending centrally through a block, which block has a substantially cruciform transverse cross-section having four outwardly extending portions, and through-holes extending respectively from an outer wall area of the block to said through-hole, each of said outer wall areas being located between one of said outwardly-extending portions of said block and another one of said outwardly-extending portions adjacent to the first-mentioned outwardly-extending portion.

5. A multi-axis lioad sensor according to claim 1, wherein said parallel plate structure is defined by a first through-hole extending centrally through a block which has a substantially cruciform transverse cross-section having four outwardly extending portions, second through-holes extending respectively through said outwardly-extending portions of said block, and third through-holes extending respectively from outer wall areas of said block to said first through-hole, each of said outer wall areas being located between one of said outwardly-extending portions of said block and another one of said outwardly-extending portions adjacent to the first-mentioned outwardly-extending portion.

6. A multi-axis load sensor according to claim 1, comprising said parallel plate structure and a radial plate structure composed as an a unitary member by combining a symmetrical parallel plate structure and a symmetrical radial plate structure with the standard axis of the symmetrical parallel plate structure being coincident with the standard axis of the symmetrical radial plate structure.

7. A multi-axis load sensor comprising two rigid members and at least one radial plate structure connecting said two rigid members to each other, said at least one radial plate structure being composed of a plurality of thin-walled plates arranged radially relative to a given point and adapted to detect forces and moments, said at least one radial plate structure being equipped with:
   (a) first detection means for detecting deformation of the bending deformation mode developed in said thin-walled plates by moment components applied about the standard axis of said radial plate structure and
   (b) second detection means for detecting deformations of a deformation mode different from the bending deformation mode.

8. A multi-axis load sensor according to claim 7 wherein said second detection means comprise means capable of detecting at least one type of deformation selected from the group consisting of:
   (a) deformations of the twisting deformation mode casued by moment components about the central axis of said radial plate structure;
   (b) deformations of the twisting deformation mode caused by moment components about the perpendicular axis of said radial plate structure;
   (c) deformations of the expansion and contraction deformation mode caused by force components along the central axis of said radial plate structure; and
   (d) deformations of the expansion and contraction deformation mode caused by force components along the perpendicular axis of said radial plate structure.

* * * * *